(12) United States Patent
Seki et al.

(10) Patent No.: US 8,448,028 B2
(45) Date of Patent: May 21, 2013

(54) SYSTEM MONITORING METHOD AND SYSTEM MONITORING DEVICE

(75) Inventors: Yukiko Seki, Kawasaki (JP); Motoyuki Kawaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 492 days.

(21) Appl. No.: 12/656,147

(22) Filed: Jan. 19, 2010

(65) Prior Publication Data

US 2010/0192022 A1    Jul. 29, 2010

Related U.S. Application Data

(63) Continuation of application No. PCT/JP2007/064254, filed on Jul. 19, 2007.

(51) Int. Cl.
*G06F 11/00* (2006.01)
(52) U.S. Cl.
USPC .............................. 714/47.1; 714/25; 714/48
(58) Field of Classification Search
USPC .................................................. 714/47.1, 25
See application file for complete search history.

(56) References Cited

U.S. PATENT DOCUMENTS

| | | | |
|---|---|---|---|
| 7,673,189 B2 * | 3/2010 | Duyanovich et al. | 714/47.1 |
| 7,743,150 B1 * | 6/2010 | Carter et al. | 709/227 |
| 2005/0289231 A1 | 12/2005 | Harada et al. | |
| 2006/0101308 A1 | 5/2006 | Agarwal et al. | |
| 2006/0190596 A1 | 8/2006 | Horikawa | |

FOREIGN PATENT DOCUMENTS

| | | |
|---|---|---|
| GB | 2 390 447 | 1/2004 |
| GB | 2 447 144 | 9/2008 |
| JP | 2002-82926 | 3/2002 |
| JP | 2004-86435 | 3/2004 |
| JP | 2006-11683 | 1/2006 |
| JP | 2006-92358 | 4/2006 |
| JP | 2006-99351 | 4/2006 |
| JP | 2006-146600 | 6/2006 |
| JP | 2006-227999 | 8/2006 |
| JP | 2006-323471 | 11/2006 |
| JP | 2006-348343 | 12/2006 |

OTHER PUBLICATIONS

International Search Report for PCT/JP2007/064254, mailed Aug. 14, 2007.
British Office Action for related British Patent Application No. 1000823.3, mailed on Jul. 13, 2011.

* cited by examiner

*Primary Examiner* — Scott Baderman
*Assistant Examiner* — Sarai Butler
(74) *Attorney, Agent, or Firm* — Staas & Halsey LLP

(57) ABSTRACT

A model-match-rate evaluating unit of a transaction monitoring device, which monitors a transaction system, evaluates a ratio of the number of transactions that match any models and respective processing times of all layers in the transaction are each within a corresponding normal range to the number of transactions observed per unit time as a model match rate. When the model-match-rate evaluating unit detects an abnormality of the system based on the model match rate, a suspicious-point-in-suspicious-model extracting unit of a transaction detail analyzing device extracts a point where a processing time deviates from the normal range as a suspicious point, a problematical-point evaluating unit evaluates a problem of each suspicious point as a problematical point, and a detail-analysis-result display unit displays an evaluation result of the problematical point and the suspicious point.

7 Claims, 26 Drawing Sheets

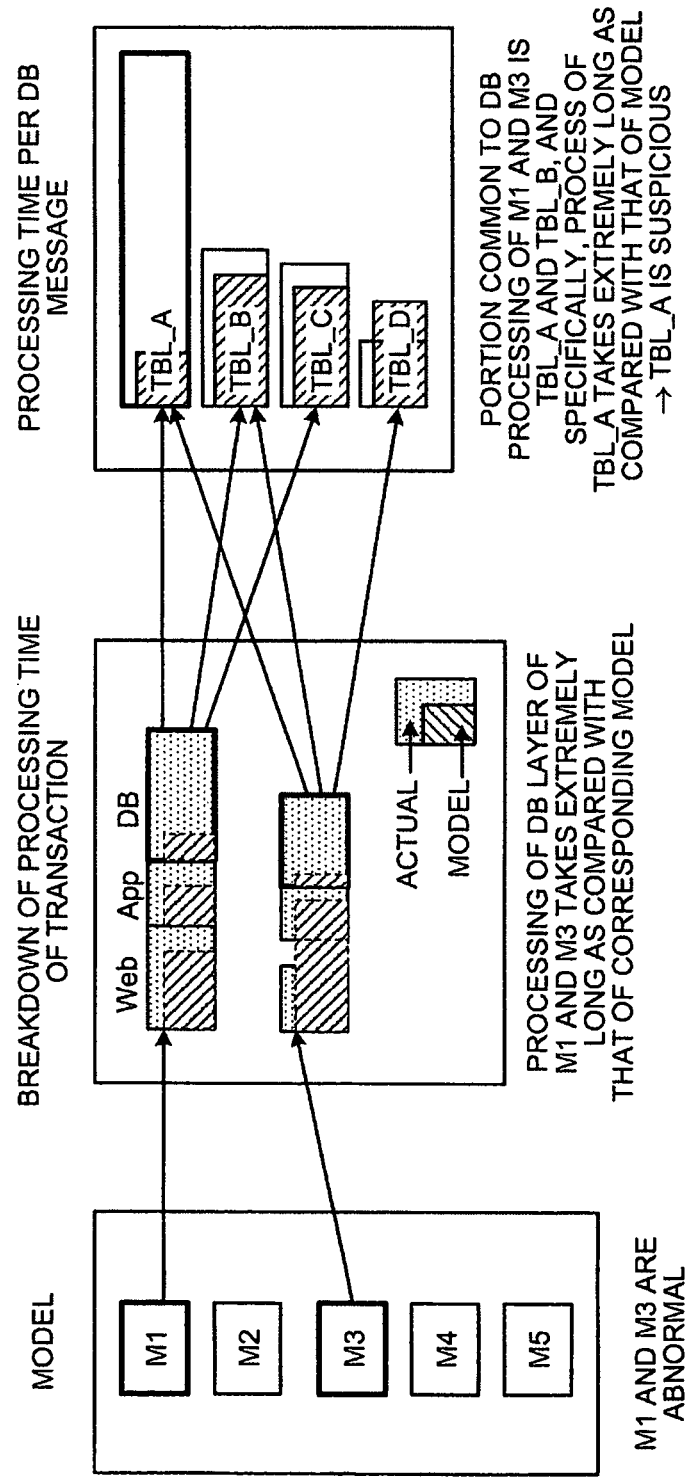

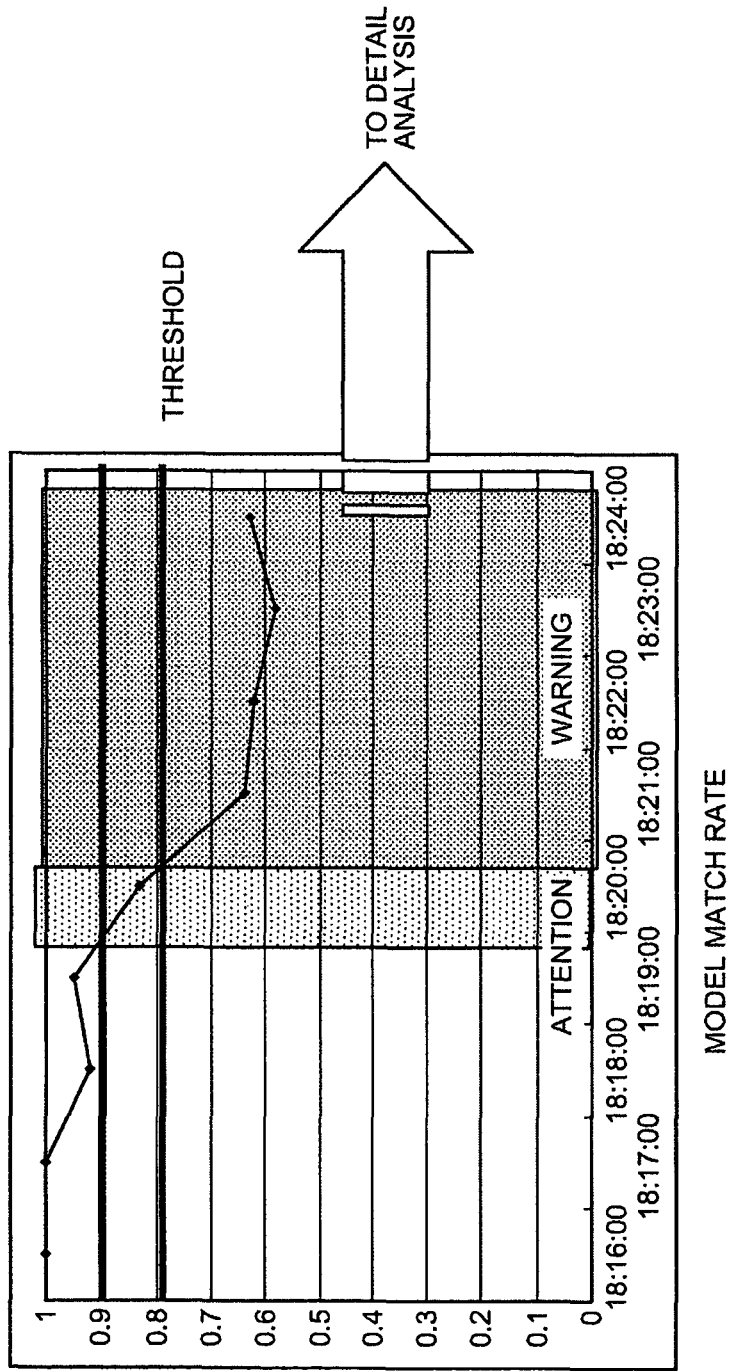

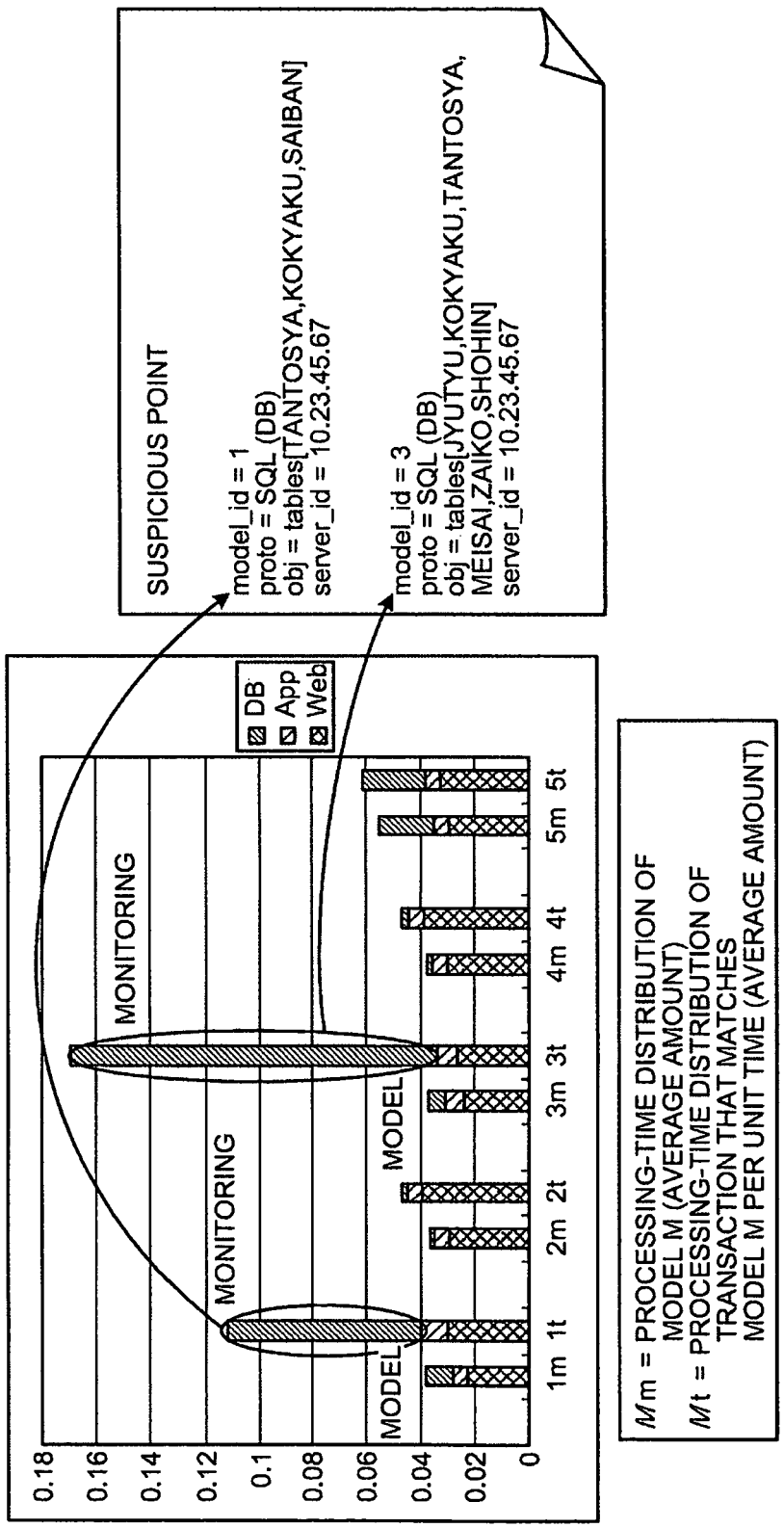

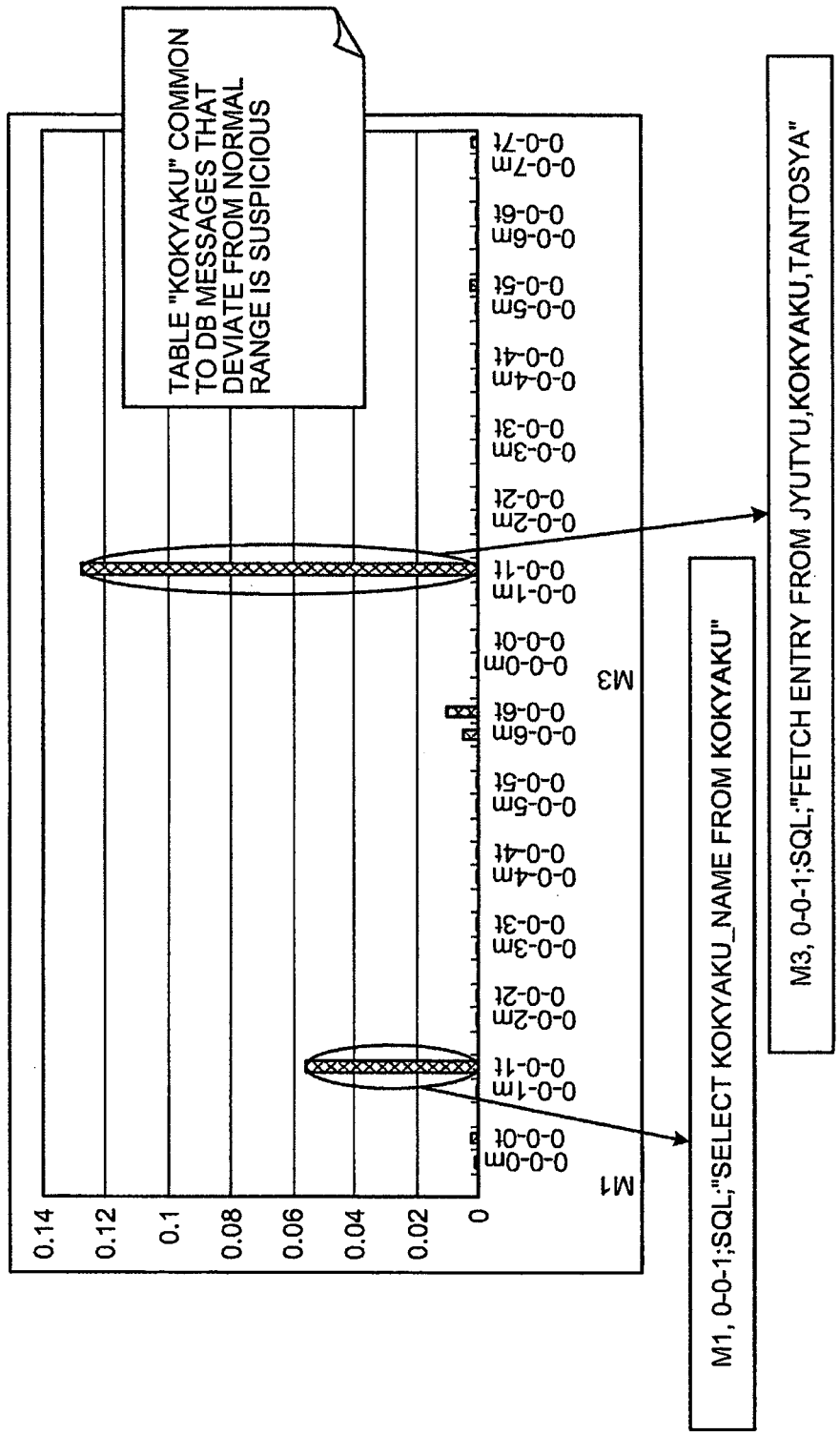

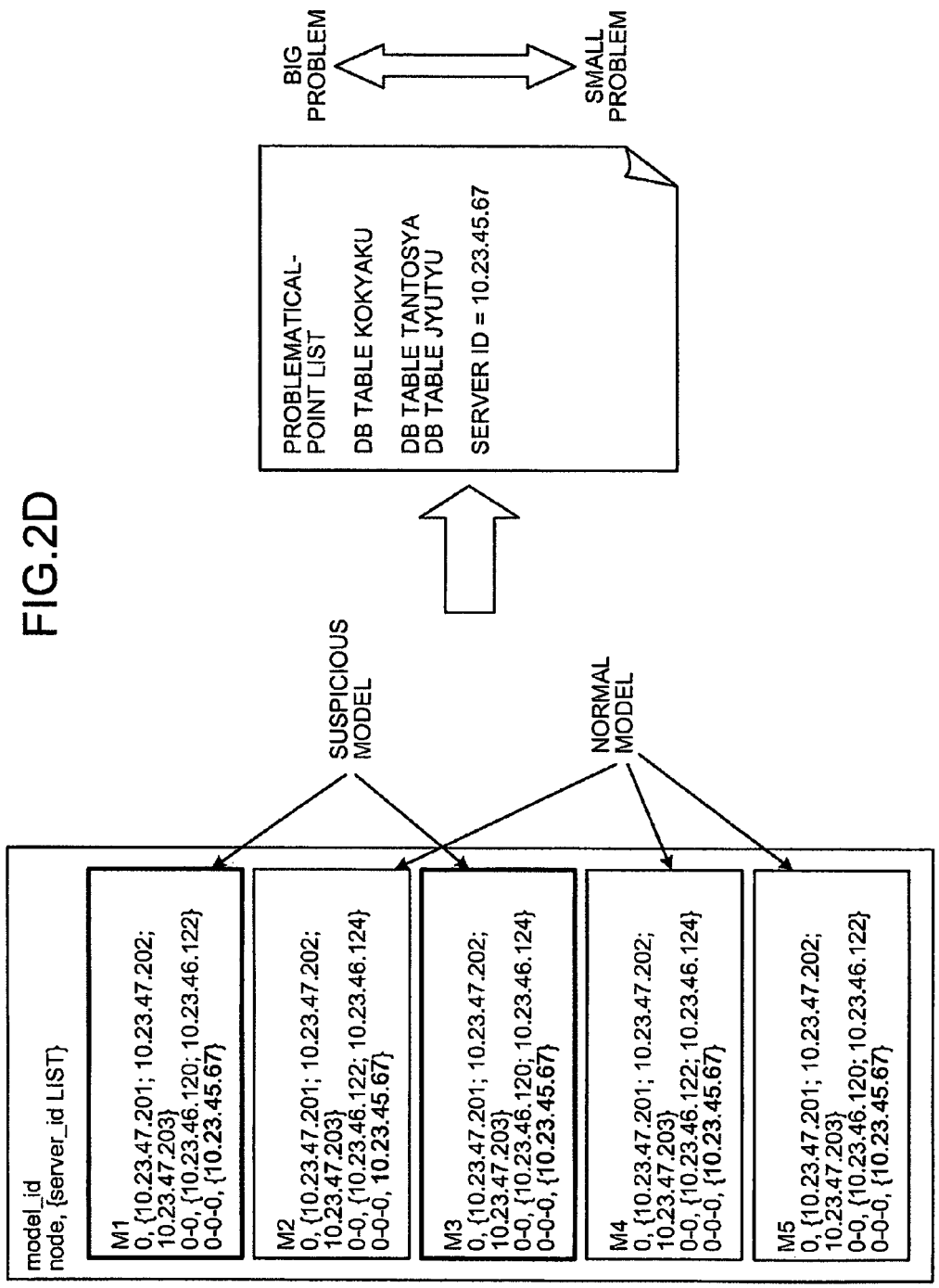

FIG.4

[NEW TRANSACTION INFORMATION]
TRANSACTION ID, START TIME, END TIME, TYPE OF PROTOCOL, PROCESSING CONTENT, CLIENT ID, SERVER ID
(...)
17, 2006/12/25 18:21:10.567717, 2006/12/25 18:21:10.663526, HTTP, "/dir/program1.cgi?", *..*.***, 10.23.47.201
17, 2006/12/25 18:21:10.586265, 2006/12/25 18:21:10.659251, IIOP, "method1", 10.23.47.201, 10.23.46.120
17, 2006/12/25 18:21:10.589463, 2006/12/25 18:21:10.590322, SQL, "SELECT TANTOSYA_NAME FROM TANTOSYA", 10.23.46.120, 10.23.45.67
17, 2006/12/25 18:21:10.590711, 2006/12/25 18:21:10.643908, SQL, "SELECT KOKYAKU_NAME FROM KOKYAKU", 10.23.46.120, 10.23.45.67
17, 2006/12/25 18:21:10.644273, 2006/12/25 18:21:10.644634, SQL, "OPEN TUBAN FROM SAIBAN", 10.23.46.120, 10.23.45.67
17, 2006/12/25 18:21:10.644891, 2006/12/25 18:21:10.645218, SQL, "FETCH TUBAN FROM SAIBAN", 10.23.46.120, 10.23.45.67
17, 2006/12/25 18:21:10.645520, 2006/12/25 18:21:10.645868, SQL, "CLOSE TUBAN FROM SAIBAN", 10.23.46.120, 10.23.45.67
17, 2006/12/25 18:21:10.646137, 2006/12/25 18:21:10.646847, SQL, "UPDATE SAIBAN", 10.23.46.120, 10.23.45.67
17, 2006/12/25 18:21:10.647088, 2006/12/25 18:21:10.657049, SQL, "trans COMMIT", 10.23.46.120, 10.23.45.67
(...)
22, 2006/12/25 18:21:12.174439, 2006/12/25 18:21:12.210096, HTTP, "/dir/program2-1.cgi?", *..*.***, 10.23.47.202
22, 2006/12/25 18:21:12.199593, 2006/12/25 18:21:12.206112, IIOP, "method2", 10.23.47.202, 10.23.46.122
22, 2006/12/25 18:21:12.202642, 2006/12/25 18:21:12.203376, SQL, "SELECT SHOHIN_NAME FROM SHOHIN", 10.23.46.122, 10.23.45.67
22, 2006/12/25 18:21:12.203738, 2006/12/25 18:21:12.204081, SQL, "trans COMMIT", 10.23.46.122, 10.23.45.67
(...)
342, 2006/12/25 18:21:12.15.872635, 2006/12/25 18:21:12.15.906537, HTTP, "/dir/program5.cgi?", *..*.***, 10.23.47.203
342, 2006/12/25 18:21:12.15.896426, 2006/12/25 18:21:12.15.902719, IIOP, "method5", 10.23.47.203, 10.23.46.122
342, 2006/12/25 18:21:12.15.899852, 2006/12/25 18:21:12.15.900500, SQL, "SELECT ENTRY_KBN FROM MEISAI", 10.23.46.122, 10.23.45.67

FIG.5

[MONITORING SETTING INFORMATION]
MODEL-MATCH-RATE EVALUATING CONDITION: 60-SECOND INTERVAL
MODEL-MATCH-RATE CRITERIA: NORMAL=[0.90, 1.00], ATTENTION=[0.80, 0.90), WARNING=[0.00, 0.80)

FIG.6A

| MODEL ID | NODE; TYPE OF PROTOCOL; PROCESSING CONTENT, NORMAL RANGE |
|---|---|
| M1 | 0;HTTP;"/dir/program1.cgi?", [0.0170, 0.1500]<br>0-0;IIOP;"method1", [0.0045, 0.0820]<br>0-0-*;SQL;"tables[TANTOSYA,KOKYAKU,SAIBAN]", [0.0058, 0.0368]<br>0-0-0;SQL;"SELECT TANTOSYA_NAME FROM TANTOSYA", [0.000560, 0.00152]<br>0-0-1;SQL;"SELECT KOKYAKU_NAME FROM KOKYAKU", [0.000560, 0.00110]<br>0-0-2;SQL;"OPEN TUBAN FROM SAIBAN", [0.000250, 0.00105]<br>0-0-3;SQL;"FETCH TUBAN FROM SAIBAN", [0.000304, 0.00844]<br>0-0-4;SQL;"CLOSE TUBAN FROM SAIBAN", [0.000321, 0.000540]<br>0-0-5;SQL;"UPDATE SAIBAN", [0.000630, 0.00103]<br>0-0-6;SQL;"trans COMMIT", [0.00125, 0.0319] |
| M2 | 0;HTTP;"/dir/program2-1.cgi?", [0.0234, 0.1458]<br>0-0;IIOP;"method2", [0.0047, 0.0363]<br>0-0-*;SQL;"tables[SHOHIN]", [0.0011, 0.0029]<br>0-0-0;SQL;"SELECT SHOHIN_NAME FROM SHOHIN", [0.000576, 0.00184]<br>0-0-1;SQL;"trans COMMIT", [0.000299, 0.00664] |

FIG.6B

| MODEL ID | NODE; TYPE OF PROTOCOL; PROCESSING CONTENT, NORMAL RANGE |
|---|---|
| M3 | 0;HTTP;"/dir/program3.cgi?", [0.0170, 0.1686]<br>0-0;IIOP;"method3", [0.0057, 0.0251]<br>0-0-\*;SQL;"tables[JYUTYU,KOKYAKU,TANTOSYA,MEISAI,ZAIKO,SHOHIN]", [0.0050, 0.0194]<br>0-0-0;SQL;"OPEN ENTRY FROM JYUTYU,KOKYAKU,TANTOSYA", [0.000362, 0.00952]<br>0-0-1;SQL;"FETCH ENTRY FROM JYUTYU,KOKYAKU,TANTOSYA", [0.000351, 0.00137]<br>0-0-2;SQL;"CLOSE ENTRY FROM JYUTYU,KOKYAKU,TANTOSYA", [0.000331, 0.0005584]<br>0-0-3;SQL;"SELECT ENTRY_KBN FROM MEISAI", [0.000630, 0.00110]<br>0-0-4;SQL;"OPEN MEISAI_NO FROM MEISAI,ZAIKO,SHOHIN", [0.000296, 0.00137]<br>0-0-5;SQL;"FETCH MEISAI_NO FROM MEISAI,ZAIKO,SHOHIN", [0.000321, 0.000795]<br>0-0-6;SQL;"CLOSE MEISAI_NO FROM MEISAI,ZAIKO,SHOHIN", [0.000333, 0.000733]<br>0-0-7;SQL;"trans COMMIT", [0.000365, 0.00660] |
| M4 | 0;HTTP;"/dir/program2-2.cgi?", [0.0237, 0.2060]<br>0-0;IIOP;"method2", [0.0046, 0.0476]<br>0-0-\*;SQL;"tables[SHOHIN]", [0.0011, 0.0154]<br>0-0-0;SQL;"SELECT SHOHIN_NAME FROM SHOHIN", [0.000564, 0.00158]<br>0-0-1;SQL;"trans COMMIT", [0.000332, 0.0144] |

FIG.6C

| MODEL ID | NODE; TYPE OF PROTOCOL; PROCESSING CONTENT, NORMAL RANGE |
|---|---|
| M5 | 0;HTTP;"/dir/program5.cgi?", [0.0224, 0.2039]<br>0-0;IIOP;"method5", [0.0048, 0.0734]<br>0-0-\*;SQL;"tables[MEISAI,ZAIKO,SHOHIN]", [0.0153, 0.0491]<br>0-0-0;SQL;"SELECT ENTRY_KBN FROM MEISAI", [0.000701, 0.00197]<br>0-0-1;SQL;"OPEN MEISAI_NO FROM MEISAI", [0.000174, 0.00097]<br>0-0-2;SQL;"FETCH MEISAI_NO FROM MEISAI", [0.000305, 0.000532]<br>0-0-3;SQL;"UPDATE ZAIKO", [0.000613, 0.00117]<br>0-0-4;SQL;"INSERT INTO MEISAI", [0.000678, 0.0220]<br>0-0-5;SQL;"CLOSE MEISAI_NO FROM MEISAI", [0.000332, 0.000593]<br>0-0-6;SQL;"OPEN ZAIKOSU FROM ZAIKO", [0.000287, 0.000861]<br>0-0-7;SQL;"OPEN TANKA FROM SHOHIN", [0.000296, 0.000907]<br>0-0-8;SQL;"FETCH ZAIKOSU FROM ZAIKO", [0.000298, 0.000546]<br>0-0-9;SQL;"UPDATE ZAIKO", [0.000588, 0.00106]<br>0-0-10;SQL;"FETCH TANKA FROM SHOHIN", [0.000298, 0.000498]<br>0-0-11;SQL;"INSERT INTO MEISAI", [0.000627, 0.00121]<br>0-0-12;SQL;"CLOSE ZAIKOSU FROM ZAIKO", [0.002093, 0.00774]<br>0-0-13;SQL;"CLOSE TANKA FROM SHOHIN", [0.000312, 0.01651]<br>0-0-14;SQL;"trans COMMIT", [0.001667, 0.01567] |

FIG.7A

[ANALYSIS-RESULT TRANSACTION INFORMATION]
TRANSACTION ID, START TIME, END TIME, TYPE OF PROTOCOL, PROCESSING CONTENT, CLIENT ID, SERVER ID, MODEL ID, NODE, PROCESSING TIME, STATUS
(...)
17, 2006/12/25 18:21:10.567717, 2006/12/25 18:21:10.663526, HTTP, "/dir/program1.cgi?", *..*.***, 10.23.47.201, 1, 0, 0.022823, NORMAL
17, 2006/12/25 18:21:10.586265, 2006/12/25 18:21:10.659251, IIOP, "method1", 10.23.47.201, 10.23.46.120, 1, 0-0, 0.00540, NORMAL
17, 2006/12/25 18:21:10.589463, 2006/12/25 18:21:10.657049, SQL, "tables[TANTOSYA,KOKYAKU,SAIBAN]", 10.23.46.120, 10.23.45.67, 1, 0-0-*, 0.067586, PROBLEMATICAL
17, 2006/12/25 18:21:10.589463, 2006/12/25 18:21:10.590322, SQL, "SELECT TANTOSYA_NAME FROM TANTOSYA", 10.23.46.120, 10.23.45.67, 1, 0-0-0, 0.000859, NORMAL
17, 2006/12/25 18:21:10.590711, 2006/12/25 18:21:10.643908, SQL, "SELECT KOKYAKU_NAME FROM KOKYAKU", 10.23.46.120, 10.23.45.67, 1, 0-0-1, 0.053197, PROBLEMATICAL
17, 2006/12/25 18:21:10.644273, 2006/12/25 18:21:10.644634, SQL, "OPEN TUBAN FROM SAIBAN", 10.23.46.120, 10.23.45.67, 1, 0-0-2, 0.000361, NORMAL
17, 2006/12/25 18:21:10.644891, 2006/12/25 18:21:10.645218, SQL, "FETCH TUBAN FROM SAIBAN", 10.23.46.120, 10.23.45.67, 1, 0-0-3, 0.000327, NORMAL
17, 2006/12/25 18:21:10.645520, 2006/12/25 18:21:10.645868, SQL, "CLOSE TUBAN FROM SAIBAN", 10.23.46.120, 10.23.45.67, 1, 0-0-4, 0.000348, NORMAL
17, 2006/12/25 18:21:10.646137, 2006/12/25 18:21:10.646847, SQL, "UPDATE SAIBAN", 10.23.46.120, 10.23.45.67, 1, 0-0-5, 0.000710, NORMAL
17, 2006/12/25 18:21:10.647088, 2006/12/25 18:21:10.657049, SQL, "trans COMMIT", 10.23.46.120, 10.23.45.67, 1, 0-0-6, 0.009961, NORMAL
(...)

FIG.7B

[ANALYSIS-RESULT TRANSACTION INFORMATION]
TRANSACTION ID, START TIME, END TIME, TYPE OF PROTOCOL, PROCESSING CONTENT, CLIENT ID, SERVER ID, MODEL ID, NODE, PROCESSING TIME, STATUS
(...)
22, 2006/12/25 18:21:12.174439, 2006/12/25 18:21:12.210096, HTTP, "dir/program2-1.cgi?", *..*.***, 10.23.47.202, 2, 0, 0.029138, NORMAL
22, 2006/12/25 18:21:12.199593, 2006/12/25 18:21:12.206112, IIOP, "method2", 10.23.47.202, 10.23.46.122, 2, 0-0, 0.005080, NORMAL
22, 2006/12/25 18:21:12.202642, 2006/12/25 18:21:12.204081, SQL, "SELECT SHOHIN_NAME FROM SHOHIN", 10.23.46.122, 10.23.45.67, 2, 0-0-*, 0.001439, NORMAL
22, 2006/12/25 18:21:12.202642, 2006/12/25 18:21:12.203376, SQL, "SELECT SHOHIN_NAME FROM SHOHIN", 10.23.46.122, 10.23.45.67, 2, 0-0-0, 0.001134, NORMAL
22, 2006/12/25 18:21:12.203738, 2006/12/25 18:21:12.204081, SQL, "trans COMMIT", 10.23.46.122, 10.23.45.67, 2, 0-0-1, 0.006293, NORMAL
(...)
342, 2006/12/25 18:21:12.15.872635, 2006/12/25 18:21:12.15.906537, HTTP, "dir/program5.cgi?", *..*.***, 10.23.47.203, 0, 0, NON-MATCHING
342, 2006/12/25 18:21:12.15.896426, 2006/12/25 18:21:12.15.902719, IIOP, "method5", 10.23.47.203, 10.23.46.122, 0, 0-0, NON-MATCHING
342, 2006/12/25 18:21:12.15.899852, 2006/12/25 18:21:12.15.900500, SQL, "SELECT ENTRY_KBN FROM MEISAI", 10.23.46.122, 10.23.45.67, 0, 0-0-0, NON-MATCHING
(...)

FIG.8

```
[MONITORING INFORMATION]
TIME, NUMBER OF OBSERVED TRANSACTIONS, NUMBER
OF NORMAL MODELS, MODEL MATCH RATE, STATUS
...
2006/12/25 18:16:00, 48, 48, 1.00, NORMAL
2006/12/25 18:17:00, 55, 55, 1.00, NORMAL
2006/12/25 18:18:00, 62, 58, 0.93, NORMAL
2006/12/25 18:19:00, 66, 63, 0.95, NORMAL
2006/12/25 18:20:00, 58, 49, 0.84, ATTENTION
2006/12/25 18:21:00, 55, 35, 0.63, WARNING
2006/12/25 18:22:00, 51, 32, 0.62, WARNING
2006/12/25 18:23:00, 47, 27, 0.57, WARNING
2006/12/25 18:24:00, 50, 31, 0.62, WARNING
```

FIG.11

[DETAIL-ANALYSIS SETTING]

COST COEFFICIENT OF EDIT DISTANCE FOR CALCULATION OF
DISSIMILARITY BETWEEN TRANSACTION AND MODEL
FOR ADDITION: 0.02
FOR DELETION: 0.8

DISSIMILARITY THRESHOLD (FOR MODEL): 1.0

FIG.12A

[INTER-TRANSACTION-COMPONENT DISSIMILARITY]

SYMBOL, TYPE OF PROTOCOL, "CHARACTER STRING", CHARACTER-STRING LENGTH
A,HTTP,"/dir/program1.cgi?",18
J,HTTP,"/dir/program2-1.cgi?",20
V,HTTP,"/dir/program2-2.cgi?",20
M,HTTP,"/dir/program3.cgi?",18
W,HTTP,"/dir/program5.cgi?",18
B,IIOP,"method1",7
K,IIOP,"method2",7
N,IIOP,"method3",7
X,IIOP,"method5",7

SYMBOL, TYPE OF PROTOCOL, "CHARACTER STRING", CHARACTER-STRING LENGTH
Q,SQL,"CLOSE ENTRY FROM JYUTYU,KOKYAKU,TANTOSYA",40
c,SQL,"CLOSE MEISAI_NO FROM MEISAI",27
U,SQL,"CLOSE MEISAI_NO FROM MEISAI,ZAIKO,SHOHIN",40
i,SQL,"CLOSE TANKA FROM SHOHIN",23
G,SQL,"CLOSE TUBAN FROM SAIBAN",23
h,SQL,"CLOSE ZAIKOSU FROM ZAIKO",24
P,SQL,"FETCH ENTRY FROM JYUTYU,KOKYAKU,TANTOSYA",40
Z,SQL,"FETCH MEISAI_NO FROM MEISAI",27
T,SQL,"FETCH MEISAI_NO FROM MEISAI,ZAIKO,SHOHIN",40
g,SQL,"FETCH TANKA FROM SHOHIN",23
F,SQL,"FETCH TUBAN FROM SAIBAN",23
f,SQL,"FETCH ZAIKOSU FROM ZAIKO",24
b,SQL,"INSERT INTO MEISAI",18
O,SQL,"OPEN ENTRY FROM JYUTYU,KOKYAKU,TANTOSYA",39
Y,SQL,"OPEN MEISAI_NO FROM MEISAI",26
S,SQL,"OPEN MEISAI_NO FROM MEISAI,ZAIKO,SHOHIN",39
e,SQL,"OPEN TANKA FROM SHOHIN",22
E,SQL,"OPEN TUBAN FROM SAIBAN",22
d,SQL,"OPEN ZAIKOSU FROM ZAIKO",23
R,SQL,"SELECT ENTRY_KBN FROM MEISAI",28
D,SQL,"SELECT KOKYAKU_NAME FROM KOKYAKU",32
L,SQL,"SELECT SHOHIN_NAME FROM SHOHIN",30
C,SQL,"SELECT TANTOSYA_NAME FROM TANTOSYA",34
H,SQL,"UPDATE SAIBAN",13
a,SQL,"UPDATE ZAIKO",12
I,SQL,"trans COMMIT",12

FIG.12B

[INTER-TRANSACTION-COMPONENT DISSIMILARITY]
p, q, (EDIT DISTANCE BETWEEN p AND q), ed(p, q)

| | | | |
|---|---|---|---|
| A,A,0,0 | B,J,1,1 | C,I,29,0.6304 | D,M,1,1 |
| A,B,1,1 | B,K,1,0.0714 | C,J,1,1 | D,N,1,1 |
| (...) | B,L,1,1 | C,K,1,1 | D,O,31,0.4366 |
| A,I,1,1 | B,M,1,1 | C,L,14,0.2187 | D,P,31,0.4305 |
| A,J,2,0.0526 | B,N,1,0.0714 | C,M,1,1 | D,Q,31,0.4305 |
| A,K,1,1 | B,O,1,1 | C,N,1,1 | D,R,16,0.2666 |
| A,L,1,1 | B,W,1,1 | C,O,26,0.3561 | D,S,31,0.4366 |
| A,M,1,0.0277 | B,X,1,0.0714 | C,P,27,0.3648 | D,T,30,0.4166 |
| A,N,1,1 | B,Y,1,1 | C,Q,26,0.3513 | D,U,31,0.4305 |
| (...) | (...) | C,R,16,0.2580 | D,V,1,1 |
| A,U,1,1 | B,i,1,1 | C,S,31,0.4246 | D,W,1,1 |
| A,V,3,0.0789 | C,C,0,0 | C,T,30,0.4054 | D,X,1,1 |
| A,W,1,0.0277 | C,D,14,0.212 | C,U,31,0.4189 | D,Y,20,0.3448 |
| A,X,1,1 | C,E,22,0.392 | C,V,1,1 | D,Z,19,0.3220 |
| (...) | C,F,21,0.368 | C,W,1,1 | D,a,26,0.5909 |
| A,i,1,1 | C,G,22,0.385 | C,X,1,1 | D,b,25,0.5000 |
| B,B,0,0 | C,H,28,0.595 | C,Y,22,0.3666 | D,c,20,0.3389 |
| B,C,1,1 | | C,Z,21,0.3442 | D,d,22,0.4000 |
| | | | D,e,22,0.4074 |
| | | | D,f,21,0.3750 |
| | | | D,g,21,0.3818 |
| | | | D,h,22,0.3928 |
| | | | D,i,22,0.4000 |
| | | | (...) |
| | | | h,h,0,0 |
| | | | h,i,11,0.2340 |
| | | | i,i,0,0 | ed(p, q), DISSIMILARITY BETWEEN
TRANSACTION COMPONENTS p AND q
=(EDIT DISTANCE BETWEEN p AND q)/
(SUM OF CHARACTER-STRING
LENGTHS)
...p AND q ARE SAME IN TYPE OF
PROTOCOL
=1 (DEFINED VALUE)
...p AND q DIFFER IN TYPE OF
PROTOCOL

INFORMATION ON COMPONENT
SYMBOL, TYPE, "CHARACTER
STRING", CHARACTER-STRING
LENGTH
A,HTTP,"/dir/program1.cgi?",18
B,IIOP,"method1",7
...
M,HTTP,"/dir/program3.cgi?",18
N,IIOP,"method3",7
...

INTER-TRANSACTION-
COMPONENT DISSIMILARITY
ed(A, A) = 0
ed(A, B) = 1
...
ed(A, M) = 1/(18 + 18) = 0.0277
...
ed(B, N) = 1/(7 + 7) = 0.0714
...

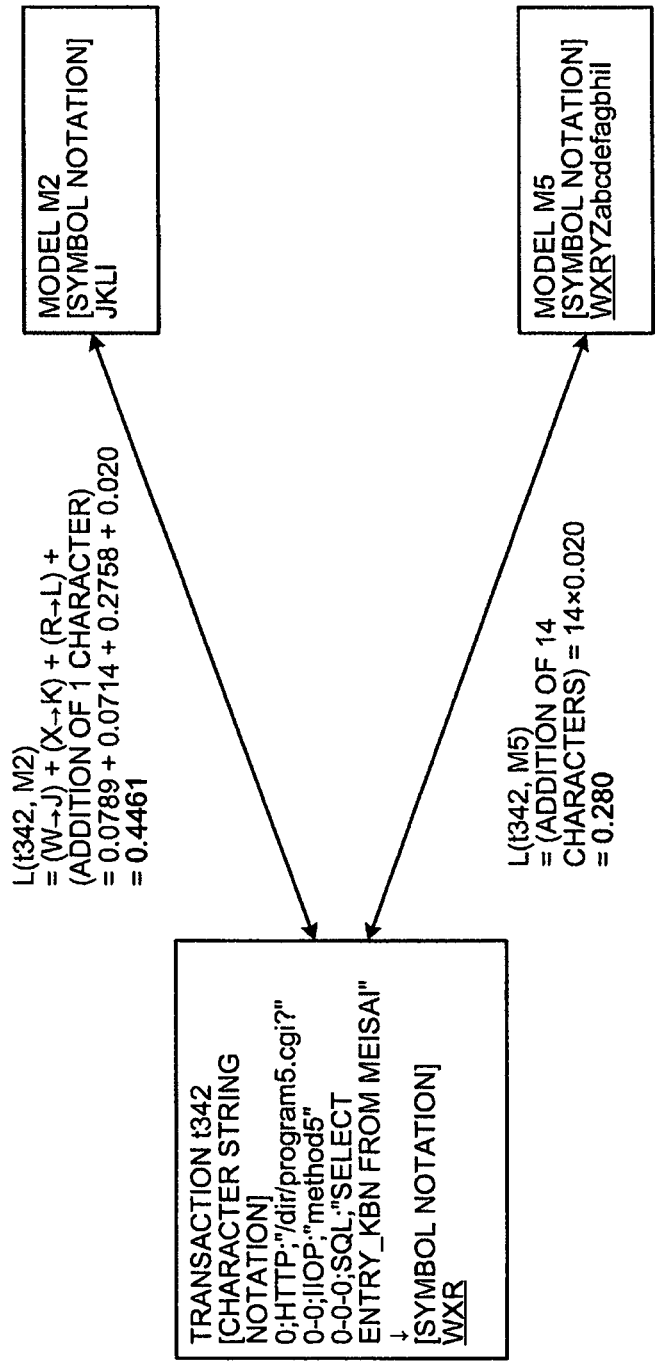

FIG.14

[ANALYSIS-RESULT TRANSACTION INFORMATION]
TRANSACTION ID, START TIME, END TIME, TYPE OF PROTOCOL, PROCESSING CONTENT, CLIENT ID, SERVER ID, MODEL ID, NODE, PROCESSING TIME, STATUS
342, 2006/12/25 18:21:12.15.872635, 2006/12/25 18:21:12.15.906537, HTTP, "/dir/program5.cgi?", *..*.***, 10.23.47.203, (5), 0, NON-MATCHING
342, 2006/12/25 18:21:12.15.896426, 2006/12/25 18:21:12.15.902719, IIOP, "method5", 10.23.47.203, 10.23.46.122, (5), 0-0, NON-MATCHING
342, 2006/12/25 18:21:12.15.899852, 2006/12/25 18:21:12.15.900500, SQL, "SELECT ENTRY_KBN FROM MEISAI", 10.23.46.122, 10.23.45.67, (5), 0-0-0, NON-MATCHING

FIG.16

PROBLEM OF PROBLEMATICAL POINT x (IN TIME PERIOD s)
=(NUMBER OF TIMES SUSPICIOUS MODEL IN WHICH x IS SUSPICIOUS POINT EMERGES)/
(NUMBER OF TIMES MODEL HAVING x AS COMPONENT OR SUSPICIOUS MODEL EMERGES)

NUMBER OF TIMES OF EMERGENCE OF MODEL

| TIME PERIOD | M1 | M2 | M3 | M4 | M5 | Total |
|---|---|---|---|---|---|---|
| 2006/12/25 18:21 | 11 | 12 | 9 | 12 | 11 | 55 |

↑ SUSPICIOUS MODEL (M1, M3)

PROBLEMATICAL-POINT LIST
A: SUSPICIOUS MODEL IN WHICH x IS SUSPICIOUS POINT
B: MODEL HAVING x AS COMPONENT OR SUSPICIOUS MODEL

| PROBLEMATICAL POINT | A | B | PROBLEM |
|---|---|---|---|
| TYPE OF PROTOCOL = SQL(DB) | M1, M3 | M1, M2, M3, M4, M5 | 20/55 = 0.36 |
| TABLE =KOKYAKU | M1, M3 | M1, M3 | 20/20 = 1.00 |
| TABLE =TANTOSYA | M3 | M1, M3 | 9/20 = 0.45 |
| TABLE = JYUTYU | M3 | M1, M3 | 9/20 = 0.45 |
| SERVER ID = 10.23.45.67 | M1, M3 | M1, M2, M3, M4, M5 | 20/55 = 0.36 |

SUSPICIOUS POINT

M1
SQL (DB)
0-0-1;SQL;"SELECT KOKYAKU_NAME FROM KOKYAKU"
SERVER ID = 10.23.45.67

M3
SQL (DB)
0-0-1;SQL;"FETCH ENTRY FROM JYUTYU,KOKYAKU,TANTOSYA"
SERVER ID = 10.23.45.67

FIG.17

```
RESULT OF DETAIL ANALYSIS ###

[TIME PERIOD]
2005/12/25 18:21

[SUSPICIOUS POINT]

M1
SQL (DB)
0-0-1;SQL;"SELECT KOKYAKU_NAME FROM KOKYAKU"
SERVER ID = 10.23.45.67

M3
SQL (DB)
0-0-1;SQL;"FETCH ENTRY FROM JYUTYU,KOKYAKU,TANTOSYA"
SERVER ID = 10.23.45.67

[PROBLEMATICAL-POINT LIST (IN DESCENDING ORDER OF PROBLEM)]

PROBLEM, OBJECT
1.00, DB TABLE = KOKYAKU
0.45, DB TABLE = TANTOSYA
0.45, DB TABLE = JYUTYU
0.36, TYPE OF PROTOCOL = SQL (DB)
0.36, SERVER ID = 10.23.45.67
```

SYSTEM MONITORING METHOD AND SYSTEM MONITORING DEVICE

CROSS-REFERENCE TO RELATED APPLICATION(S)

This application is a continuation of International Application No. PCT/JP2007/064254, filed on Jul. 19, 2007, the entire contents of which are incorporated herein by reference.

FIELD

The embodiments discussed herein are directed to a system monitoring device for monitoring a system that executes multiple types of unit processes, and more particularly, to a system monitoring program, a system monitoring method, and a system monitoring device capable of detecting an abnormality of a system with accuracy by monitoring the system based on multiple unit-process models, that is models of multiple types of unit processes and a processing time.

BACKGROUND

In recent years, in various fields, a computer system has served as an essential infrastructure system, and it has become much more important to cause the computer system to operate properly without bringing the computer system to a halt. Consequently, there has been developed various technologies for monitoring an operational status of a computer system to detect an abnormality of the system early.

For example, in a business system, since analyzing a transaction (a flow of a service process), a unit process, is useful for monitoring a processing status, there has been developed a technology of collecting a log of messages exchanged over a network for a service process and estimating a transaction based on a calling relationship among the messages in the log (see Japanese Laid-open Patent Publication No. 2006-11683). By using such a technology, many different types of transactions in the business system, including low-frequency ones, can be extracted without a human hand, and the analysis of the system can be assisted.

However, in the technology described in Japanese Laid-open Patent Publication No. 2006-11683, there is a problem that it is difficult to perceive the status of the whole system because an enormous number of types of transactions ranging from high-frequency ones to very low-frequency ones are created.

SUMMARY

According to an aspect of an embodiment of the invention, a system monitoring device for monitoring a system that executes multiple types of unit processes, includes a model-match-rate calculating unit that calculates, as a model match rate, a rate that a unit process executed by the system matches any of multiple unit-process models, that is models of the multiple types of the unit processes, and also a processing time of which is normal; and a system-status determining unit that determines whether the system is normal or not based on the model match rate calculated by the model-match-rate calculating unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is an explanatory diagram for explaining the monitoring of transactions by a transaction monitoring device and identification of an abnormal point by a transaction detail analyzing device according to an embodiment;

FIG. 2A is an explanatory diagram (1) for explaining procedures of the system monitoring/analysis by the transaction monitoring device and the transaction detail analyzing device;

FIG. 2B is an explanatory diagram (2) for explaining the procedures of the system monitoring/analysis by the transaction monitoring device and the transaction detail analyzing device;

FIG. 2C is an explanatory diagram (3) for explaining the procedures of the system monitoring/analysis by the transaction monitoring device and the transaction detail analyzing device;

FIG. 2D is an explanatory diagram (4) for explaining the procedures of the system monitoring/analysis by the transaction monitoring device and the transaction detail analyzing device;

FIG. 4 is a diagram illustrating an example of new transaction information stored in a new-transaction-information storage unit;

FIG. 5 is a diagram illustrating an example of monitoring setting information stored in a monitoring-setting-information storage unit;

FIG. 6A is a diagram (1) illustrating an example of model information stored in a model-information storage unit;

FIG. 6B is a diagram (2) illustrating an example of model information stored in the model-information storage unit;

FIG. 6C is a diagram (3) illustrating an example of model information stored in the model-information storage unit;

FIG. 7A is a diagram (1) illustrating an example of analysis-result transaction information stored in an analysis-result-transaction-information storage unit;

FIG. 7B is a diagram (2) illustrating an example of analysis-result transaction information stored in the analysis-result-transaction-information storage unit;

FIG. 8 is a diagram illustrating an example of monitoring information stored in a monitoring-information storage unit;

FIG. 11 is a diagram illustrating an example of detail-analysis setting information stored in a detail-analysis setting-information storage unit;

FIG. 12A is a diagram (1) illustrating an example of an inter-transaction-component dissimilarity stored in an inter-transaction-component dissimilarity storage unit;

FIG. 12B is a diagram (2) illustrating an example of an inter-transaction-component dissimilarity stored in the inter-transaction-component dissimilarity storage unit;

FIG. 13 is an explanatory diagram for explaining a dissimilarity between a transaction ti and a model Mj;

FIG. 14 is a diagram illustrating an example of analysis-result transaction information stored in an analysis-result-transaction-information storage unit;

FIG. 16 is an explanatory diagram for explaining the evaluation of a problem by a problematical-point evaluating unit;

FIG. 17 is a diagram illustrating an example of a result of detail analysis that is displayed by a detail-analysis-result display unit;

DESCRIPTION OF EMBODIMENTS

Figure 3:
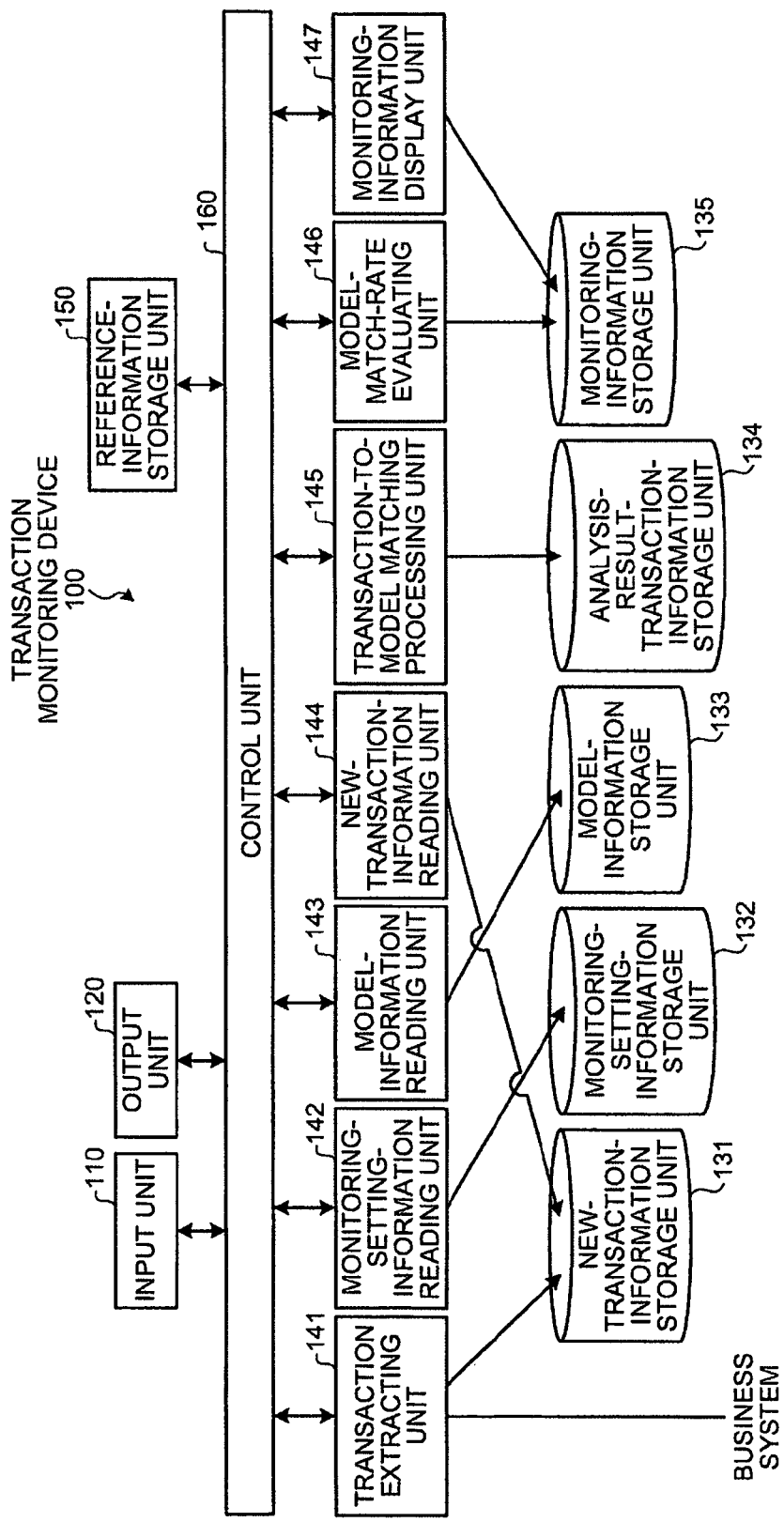
FIG. 3 is a functional block diagram illustrating a configuration of the transaction monitoring device.

Preferred embodiments of the present invention will be explained with reference to accompanying drawings. In what follows, there is described a case where a transaction monitoring device monitors a business system and a transaction detail analyzing device performs a detail analysis of transactions if an abnormality is detected in the business system; however, it can be configured to cause a single device to perform the monitoring of the business system and the detail analysis of transactions.

First, the monitoring of transactions by a transaction monitoring device and identification of an abnormal point by a transaction detail analyzing device according to the present embodiment are explained. FIG. 1 is an explanatory diagram for explaining the monitoring of transactions by the transaction monitoring device and identification of an abnormal point by the transaction detail analyzing device according to the present embodiment. The transaction monitoring device and transaction detail analyzing device according to the present embodiment store therein models and processing times of transactions by types of the transactions.

The transaction monitoring device according to the present embodiment compares an actual transaction with the models, and determines that the transaction is abnormal if there is no matched model. Furthermore, even when there is a matched model, if any of respective processing times of a Web layer, an application (App) layer, and a database (DB) layer of the business system is extremely longer than a processing time of a corresponding layer of the model, the transaction monitoring device determines that the transaction is abnormal. In FIG. 1, since processing of the DB layer of each of transactions that match models "M1" and "M3" takes extremely long as compared with that of the corresponding model, it is determined that these transactions are abnormal.

In this manner, the transaction monitoring device according to the present embodiment determines whether an actual transaction is abnormal by not only determining whether the transaction matches any models but also comparing a processing time of each of the Web layer, the App layer, and the DB layer with that of the model, and therefore the transaction monitoring device can detect an abnormal transaction even though the transaction matches the model, and can detect an abnormality of the system more accurately than a case where the system is monitored based on only whether to match any models. A transaction monitoring device that monitors a system with models only without a processing time is described in Japanese Laid-open Patent Publication No. 2006-099351.

The transaction detail analyzing device according to the present embodiment stores therein a processing time with respect to each DB message together with the processing time of the DB layer, and compares the processing time with respect to each DB message with that of the model if there is an abnormality in processing of the DB layer, and thereby identifying which one of tables constituting the database has a problem. In FIG. 1, a portion of database processing common to the transactions that match "M1" and "M3", respectively, is processes of tables "TBL_A" and "TBL_B", and since the process of "TBL_A" takes particularly longer than that of the model, "TBL_A" is identified as a problematical point.

In this manner, if there is an abnormality in processing of the DB layer, the transaction detail analyzing device according to the present embodiment identifies which one of tables constituting a database has a problem by comparing a processing time with respect to each DB message with that of a model, and therefore it is possible to assist the detail analysis of an abnormal cause.

Subsequently, a summary of procedures of the system monitoring/analysis by the transaction monitoring device and the transaction detail analyzing device according to the present embodiment is explained. FIGS. 2A to 2D are explanatory diagrams (1) to (4) for explaining the procedures of the system monitoring/analysis by the transaction monitoring device and the transaction detail analyzing device according to the present embodiment.

As illustrated in FIG. 2A, the transaction monitoring device according to the present embodiment calculates a model match rate, and if the model match rate is below a predetermined threshold, outputs a warning and instructs the transaction detail analyzing device to perform a detail analysis, and the transaction detail analyzing device starts performing the detail analysis for assisting the identification of an abnormal cause.

The model match rate here is a ratio of the number of transactions that match any models and respective processing times of all the layers in the transaction are each within a corresponding normal range to the number of transactions observed per unit time. The normal range of the processing time of each layer in the transaction can be determined based on statistics, such as "an average processing time of models±a coefficient×a standard deviation". Alternatively, a system provider can determine the normal range.

In the detail analysis, as illustrated in FIG. 2B, the transaction detail analyzing device calculates a breakdown of a processing time of each of transactions that matches respective models per unit time (an average amount of the Web layer, the App layer, and the DB layer), and extracts a point where the processing time deviates from the normal range as a suspicious point.

In FIG. 2B, since the processing time of the DB layer of the models "M1" and "M3" deviates from the normal range, the models "M1" and "M3" are extracted as a suspicious model. Furthermore, tables "TANTOSYA", "KOKYAKU", and "SAIBAN" that have been processed in the model M1 and an ID "10.23.45.67" of a server which has processed them and tables "JYUTYU", "KOKYAKU", "TANTOSYA", "MEISAI", "ZAIKO", and "SHOHIN" that have been processed in the model M3 and an ID "10.23.45.67" of a server which has processed them are extracted as a suspicious point.

Then, as illustrated in FIG. 2C, the transaction detail analyzing device obtains an average processing time with respect to each DB processing message of a DB processing message group of the DB layers, a suspicious point of each of the models "M1" and "M3", compares the obtained average processing time with an average amount of that of the model, and determines that the table "KOKYAKU" common to the DB processing messages that deviate from the normal range is a "big problem".

In FIG. 2C, the DB layer of the model M1 is composed of six DB processing messages, the DB layer of the model M3 is composed of seven DB processing messages, the second DB processing message of the model "M1" and the second DB processing message of the model "M3" deviate from the normal range, the table "KOKYAKU" is common to the both DB processing messages, and therefore the transaction detail analyzing device determines that the table "KOKYAKU" is a "big problem".

On the other hand, as illustrated in FIG. 2D, the server ID "10.23.45.67" emerges in common to the suspicious models "M1" and "M3", but also emerges in normal models "M2", "M4", and "M5" those other than the suspicious models. Therefore, the transaction detail analyzing device determines that the server "10.23.45.67" is a "small problem". Furthermore, the tables "TANTOSYA" and "JYUTYU" that emerge only in the second DB processing message of the model "M3" are ranked as the middle of "big problem" and "small problem".

In this manner, when the model match rate is below the predetermined threshold, the transaction detail analyzing device according to the present embodiment extracts suspicious points based on a processing time of a transaction, and evaluates a problem of each of the suspicious points based on how the suspicious point emerges in a suspicious model and a normal model, and therefore it is possible to assist the identification of an abnormal cause of the system.

Subsequently, a configuration of the transaction monitoring device according to the present embodiment is explained. FIG. 3 is a functional block diagram illustrating the configuration of the transaction monitoring device according to the present embodiment. As illustrated in this diagram, this transaction monitoring device 100 includes an input unit 110, an output unit 120, a new-transaction-information storage unit 131, a monitoring-setting-information storage unit 132, a model-information storage unit 133, an analysis-result-transaction-information storage unit 134, a monitoring-information storage unit 135, a transaction extracting unit 141, a monitoring-setting-information reading unit 142, a model-information reading unit 143, a new-transaction-information reading unit 144, a transaction-to-model matching processing unit 145, a model-match-rate evaluating unit 146, a monitoring-information display unit 147, a reference-information storage unit 150, and a control unit 160.

The input unit 110 is a processing unit that receives various instructions on the monitoring of transactions from the system provider, and specifically, receives the instructions made by the system provider with a mouse or keyboard. The output unit 120 is a processing unit that outputs a result of the monitoring by the transaction monitoring device 100, and specifically, displays the result of the monitoring on a display device.

The new-transaction-information storage unit 131 is a storage unit that stores therein information on a new transaction, an object of the monitoring, as new transaction information. FIG. 4 is a diagram illustrating an example of the new transaction information stored in the new-transaction-information storage unit 131. As illustrated in this diagram, the new-transaction-information storage unit 131 stores therein a transaction ID for identifying a transaction, a start time and end time of each process, a type of protocol, processing content, a client ID of the transaction, and an ID of a server which has executed the process with respect to each of processes composing the transaction as the new transaction information.

The monitoring-setting-information storage unit 132 is a storage unit that stores therein setting information on the system monitoring as monitoring setting information. FIG. 5 is a diagram illustrating an example of the monitoring setting information stored in the monitoring-setting-information storage unit 132. As illustrated in this diagram, this monitoring-setting-information storage unit 132 stores therein a model-match-rate evaluating condition and model-match-rate criteria as the monitoring setting information.

The model-match-rate evaluating condition here is a time interval to evaluate a model match rate, i.e., a rate of a new transaction matching any model. The model-match-rate criteria here is criteria for determining a processing status of the system based on the model match rate. In this example, the transaction monitoring device 100 determines that a processing status of the system is "normal" if the model match rate is "0.90 or more but not exceeding 1.00", "attention" if the model match rate is "0.80 or more but less than 0.90", and "warning" if the model match rate is "0.00 or more but less than 0.80".

The model-information storage unit 133 is a storage unit that stores therein information on models of transactions as model information. FIGS. 6A to 6C are diagrams (1) to (3) each illustrating an example of the model information stored in the model-information storage unit 133. As illustrated in these diagrams, the model-information storage unit 133 stores therein model IDs for identifying the respective models of the transactions, such as "M1" and "M2", and information for defining the respective models in an associated manner. The information for defining a model includes a node, a type of protocol, processing content, and a normal range with respect to each of processes composing the model.

The node here indicates layers (Web layer-App layer-DB layer) where a process is performed and a consecutive number in the layer. For example, a node "0" indicates the first process of the Web layer, a node "0-0" indicates the first process of the App layer in the first process of the Web layer, and a node "0-0-n" indicates the (n+1)-th process of the DB layer in the first process of the App layer in the first process of the Web layer. A node "0-0-*" is a rundown on a series of processes of the DB layer in the first process of the App layer in the first process of the Web layer, and the processing content indicates a table to be processed in the processes of the DB layer. Furthermore, the normal range indicates a lower limit and upper limit of a processing time when each process is normally performed.

For example, it indicates that a table to be processed in the processes of the DB layer in the node "0 -0-*" of the model "M1" is "TANTOSYA", "KOKYAKU", and "SAIBAN", and the processes of the DB layer are normal if a processing time is within a range of 0.0058 second to 0.0368 second.

The analysis-result-transaction-information storage unit 134 is a storage unit that stores therein a result of analysis of whether a new transaction matches any models as analysis-result transaction information. The "match" here is a case where processing content is in agreement and a processing time is within the normal range.

FIGS. 7A and 7B are diagrams (1) and (2) each illustrating an example of the analysis-result transaction information stored in the analysis-result-transaction-information storage unit 134. As illustrated in these diagrams, the analysis-result-transaction-information storage unit 134 stores therein, as the analysis-result transaction information, information that a model ID, a node, a processing time, and a status are added to the new transaction information as a result of analysis. The model ID here is a model ID of a model which processing content is in agreement with that of a new transaction, the node here is a node of the corresponding model, and the processing time here is a time taken for the process.

Furthermore, the status is "non-matching" if there is no matched model, "normal" if there is a matched model and the processing time is within the normal range, and "problematical" if the processing time deviates from the normal range although there is a matched model. Here, whether a processing time with respect to each DB message of the DB layer is within the normal range is determined, but the determination of whether a DB-message processing time is within the normal range is performed in the detail analysis to be described later.

The monitoring-information storage unit 135 is a storage unit that stores therein a result of the monitoring of a processing status of the business system as monitoring information. FIG. 8 is a diagram illustrating an example of the monitoring information stored in the monitoring-information storage unit 135. As illustrated in this diagram, the monitoring-information storage unit 135 stores therein, as the monitoring information, a time; the number of observed transactions, i.e., the number of processed transactions; the number of normal models, i.e., the number of transactions determined to be normal; a model match rate; and a status of the business system every 60 seconds as a result of the monitoring of the business system.

The 60 seconds here is a value set as the model-match-rate evaluating condition, and the status of the business system here is a status of the business system determined based on the model-match-rate criteria. The model-match-rate evaluating condition and the model-match-rate criteria are values set by the system provider as the monitoring setting information.

The transaction extracting unit 141 is a processing unit that collects a log of messages exchanged for transaction processing over a network and extracts a transaction based on a calling relationship among the messages in the log, and stores information on the extracted transaction in the new-transaction-information storage unit 131. Here, the transaction extracting unit 141 is provided in the transaction monitoring device 100; alternatively, the transaction extracting unit 141 can be provided in another device.

The monitoring-setting-information reading unit 142 is a processing unit that reads out monitoring setting information from the monitoring-setting-information storage unit 132 and writes the monitoring setting information into the reference-information storage unit 150. The model-information reading unit 143 is a processing unit that reads out model information from the model-information storage unit 133 and writes the model information into the reference-information storage unit 150.

The new-transaction-information reading unit 144 is a processing unit that reads out information on a new transaction from the new-transaction-information storage unit 131 and passes the information on the new transaction one by one to the transaction-to-model matching processing unit 145.

The transaction-to-model matching processing unit 145 is a processing unit that receives the information on the new transaction one by one from the new-transaction-information reading unit 144; determines whether the new transaction matches any models with reference to the model information stored in the reference-information storage unit 150; and if there is a matched model, determines whether a processing time with respect to each process of each of the layers is within the normal range.

The transaction-to-model matching processing unit 145 determines a status of the process to be "non-matching" if the new transaction does not match any models, "normal" if there is a matched model and the processing time is within the normal range, and "problematical" if the processing time is not within the normal range although there is a matched model. Then, the transaction-to-model matching processing unit 145 writes information on each of the processes with the addition of the status of the process together with the processing time and the like into the analysis-result-transaction-information storage unit 134. The determination of whether an individual process other than a process which is a collection of a series of processes of the DB layer is either "normal" or "problematical" is performed in the detail analysis to be described later.

In this manner, even if a new transaction matches any models, the transaction-to-model matching processing unit 145 determines whether a processing time with respect to each process of each of the layers is within the normal range, and therefore it is possible to detect an abnormality of the system more accurately on the basis of not only processing content but also the processing time of each of the layers.

The model-match-rate evaluating unit 146 is a processing unit that calculates a model match rate at a time interval defined in the model-match-rate evaluating condition and identifies a processing status of the business system based on the model-match-rate criteria, and stores the identified status as monitoring information in the monitoring-information storage unit 135. This model-match-rate evaluating unit 146 calculates, as the model match rate, a ratio of the number of transactions that match any models and respective processing times of all the layers in the transaction are each within the corresponding normal range to the number of transactions observed per unit time.

The monitoring-information display unit 147 is a processing unit that displays monitoring information stored in the monitoring-information storage unit 135 via the output unit 120. The reference-information storage unit 150 is a storage unit that stores therein the monitoring setting information and the model information that are read by the monitoring-setting-information reading unit 142 and the model-information reading unit 143, respectively. The information stored in this reference-information storage unit 150 is referred by the transaction-to-model matching processing unit 145 and the model-match-rate evaluating unit 146.

The control unit 160 controls the input unit 110, the output unit 120, the transaction extracting unit 141, the monitoring-setting-information reading unit 142, the model-information reading unit 143, the new-transaction-information reading unit 144, the transaction-to-model matching processing unit 145, the model-match-rate evaluating unit 146, and the monitoring-information display unit 147 those as described above, and makes the transaction monitoring device 100 operate as one device. In FIG. 3, the storage units are provided in a magnetic disk device, and arrows between the storage units and the processing units each indicate an access from the processing unit to the storage unit.

Figure 9:
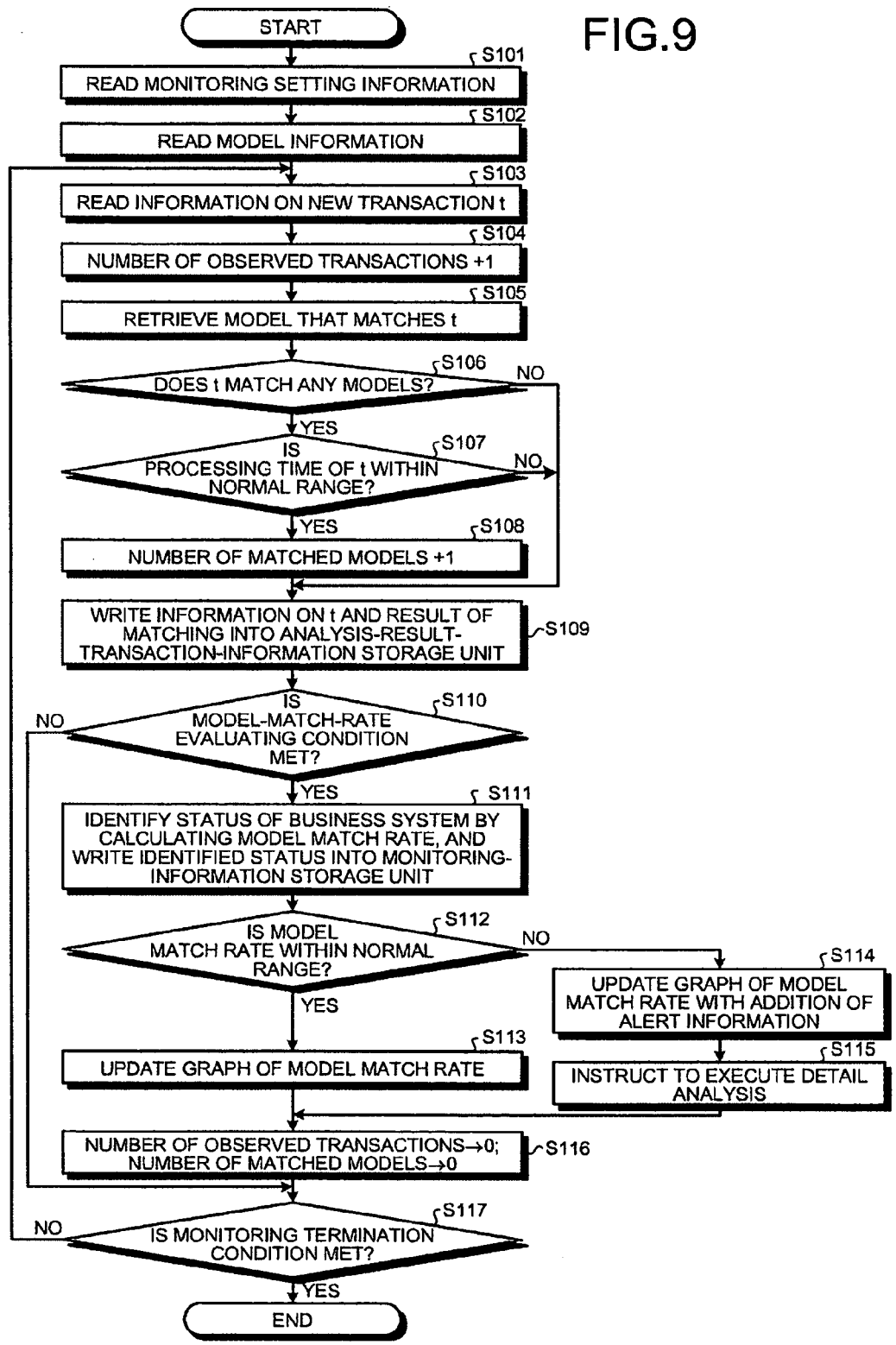
FIG. 9 is a flowchart illustrating procedures of a transaction monitoring process performed by a transaction monitoring device according to the embodiment.

Subsequently, procedures of a transaction monitoring process performed by the transaction monitoring device 100 according to the present embodiment is explained. FIG. 9 is a flowchart illustrating the procedures of the transaction monitoring process performed by the transaction monitoring device 100 according to the present embodiment.

As illustrated in this flowchart, in this transaction monitoring process, the monitoring-setting-information reading unit 142 reads monitoring setting information and writes the monitoring setting information into the reference-information storage unit 150 (Step S101), and the model-information reading unit 143 reads model information and writes the model information into the reference-information storage unit 150 (Step S102).

Then, the new-transaction-information reading unit 144 reads a new transaction t and passes the new transaction t to the transaction-to-model matching processing unit 145 (Step S103), and the transaction-to-model matching processing unit 145 adds "1" to the number of observed transactions (Step S104). The number of observed transactions shall have been initialized to "0".

Then, the transaction-to-model matching processing unit 145 retrieves a model from the reference-information storage unit 150 (Step S105), and determines whether there is any model that matches the transaction t (Step S106). As a result, if there is a model that matches the transaction t, whether a processing time of each of the layers is within the normal range is determined (Step S107), and if the processing times of all the layers are within the normal range, "1" is added to the number of matched models (Step S108). On the other hand, if there is even one of the layers which processing time is not within the normal range or there is no matched model, the number of matched models shall remain as it is. The number of matched models shall have been initialized to "0".

Then, the transaction-to-model matching processing unit 145 writes information on the transaction t, a result of the determination, and the like into the analysis-result-transaction-information storage unit 134 (Step S109). Then, the model-match-rate evaluating unit 146 refers to the model-match-rate evaluating condition stored in the reference-information storage unit 150, and determines whether the model-match-rate evaluating condition is met or not, i.e., whether it is time to evaluate a model match rate (Step S110), and if the model-match-rate evaluating condition is not met, the flow advances to Step S117.

On the other hand, if the model-match-rate evaluating condition is met, the model-match-rate evaluating unit 146 calculates a model match rate with the number of observed transactions and the number of matched models. Then, the model-match-rate evaluating unit 146 identifies a status of the business system from the calculated model match rate based on the model-match-rate criteria, and writes the identified status into the monitoring-information storage unit 135 (Step S111).

Then, the monitoring-information display unit 147 determines whether the model match rate written in the monitoring-information storage unit 135 is within a normal range (Step S112), and updates a graph display of the model match rate if the model match rate is within the normal range (Step S113), or updates a graph display of the model match rate with the addition of alert information if the model match rate is not within the normal range (Step S114). In addition, the control unit 160 instructs the transaction detail analyzing device to perform a detail analysis (Step S115).

Then, the control unit 160 initializes the number of observed transactions and the number of matched models to "0" (Step S116), and determines whether a predetermined monitoring termination condition is met (Step S117). If the predetermined monitoring termination condition is not met, the flow returns to Step S103 to process a next transaction; and if the predetermined monitoring termination condition is met, the transaction monitoring process is terminated.

In this manner, when a model match rate is not within the normal range, the control unit 160 instructs the transaction detail analyzing device to perform a detail analysis, thereby making it possible to start the detail analysis.

Figure 10:
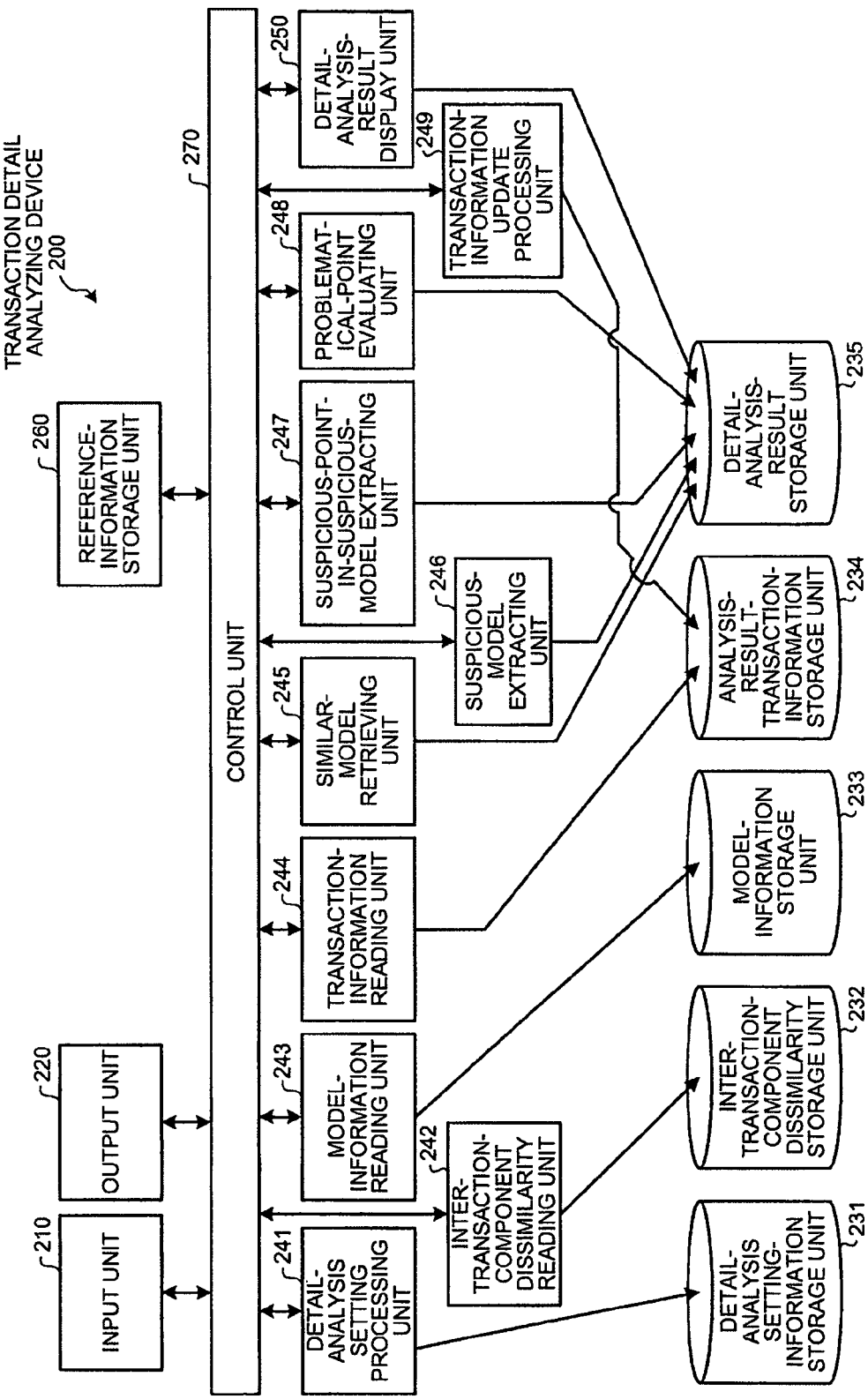
FIG. 10 is a functional block diagram illustrating a configuration of the transaction detail analyzing device.

Subsequently, a configuration of the transaction detail analyzing device is explained. FIG. 10 is a functional block diagram illustrating the configuration of the transaction detail analyzing device. As illustrated in this diagram, this transaction detail analyzing device 200 includes an input unit 210, an output unit 220, a detail-analysis setting-information storage unit 231, an inter-transaction-component dissimilarity storage unit 232, a model-information storage unit 233, an analysis-result-transaction-information storage unit 234, a detail-analysis-result storage unit 235, a detail-analysis setting processing unit 241, an inter-transaction-component dissimilarity reading unit 242, a model-information reading unit 243, a transaction-information reading unit 244, a similar-model retrieving unit 245, a suspicious-model extracting unit 246, a suspicious-point-in-suspicious-model extracting unit 247, a problematical-point evaluating unit 248, a transaction-information update processing unit 249, a detail-analysis-result display unit 250, a reference-information storage unit 260, and a control unit 270.

The input unit 210 is a processing unit that receives an instruction on the detail analysis and the like from the system provider, and specifically, receives the instruction made by the system provider with a mouse or keyboard. The output unit 220 is a processing unit that outputs a result of the analysis by the transaction detail analyzing device 200, and specifically, displays a suspicious point, its evaluation result, and the like on a display device.

The detail-analysis setting-information storage unit 231 is a storage unit that stores therein information on settings for the detail analysis as detail-analysis setting information. FIG. 11 is a diagram illustrating an example of the detail-analysis setting information stored in the detail-analysis setting-information storage unit 231. As illustrated in this diagram, the detail-analysis setting-information storage unit 231 stores therein a cost coefficient of an edit distance for the calculation of a dissimilarity between a transaction and a model.

The cost coefficient of an edit distance for the calculation of a dissimilarity between a transaction and a model here is a cost for causing a transaction t to match a model m by editing the transaction t (addition/deletion/replacement of a component), and "for addition" is a cost for adding one character (one component) to the transaction t, and "for deletion" is a cost for deleting one character (one component) from the transaction t. A cost for replacing one character (one component) p of the transaction t by another one character (one component) q is provided based on an inter-transaction-component dissimilarity stored in the inter-transaction-component dissimilarity storage unit 232 to be described below.

The inter-transaction-component dissimilarity storage unit 232 is a storage unit that stores therein a dissimilarity between transaction components, i.e., between components composing a transaction as an inter-transaction-component dissimilarity. FIGS. 12A and 12B are diagrams (1) and (2) each illustrating an example of the inter-transaction-component dissimilarity stored in the inter-transaction-component dissimilarity storage unit 232. This inter-transaction-component dissimilarity storage unit 232 stores therein, as illustrated in FIG. 12A, a symbol for identifying a component; a type of protocol of a transaction component, such as "HTTP" or "IIOP"; a "character string" composing the transaction component other than the type of protocol; and a length of the character string in an associated manner, and further stores therein, as illustrated in FIG. 12B, an edit distance and dissimilarity between transaction components.

The edit distance between the transaction components p and q here is the number of times a character is inserted/deleted/replaced with respect to the transaction component p until the transaction component q is obtained, and a dissimilarity ed(p, q) between the transaction components p and q is defined as follows:

if p and q are the same in type of protocol, ed(p, q)=(edit distance between p and q)/(sum of lengths of character strings of p and q); and if p and q differ in type of protocol, ed(p, q)=1 (defined value).

For example, in FIG. 12B, a transaction component A and a transaction component M are the same in type of protocol, and an edit distance between the transaction components is 3, that is, a character string of the transaction component M, "/dir/program3.cgi?", is obtained by the one-time insertion/deletion/replacement of a character with respect to a character string of the transaction component A, "/dir/program1.cgi?", and then, a length of the character string of the transaction component A is "18", and a length of the character string of the transaction component M is "18", and thus, a dissimilarity ed(A, M) between these transaction components A and M results in:

$$ed(A,M)=1/(18+18)=0.0277$$

Furthermore, since the transaction component A and a transaction component B differ in type of protocol, a dissimilarity ed(A, B) between these transaction components A and B has the defined value, and results in:

$$ed(A,B)=1$$

The model-information storage unit 233 is, in the same manner as the model-information storage unit 133, a storage unit that stores therein information on models of transactions as model information.

The analysis-result-transaction-information storage unit 234 is, in the same manner as the analysis-result-transaction-information storage unit 134, a storage unit that stores therein a result of analysis of a transaction as analysis-result transaction information, and further stores therein information on a similar model. The similar model here is a model most similar to a transaction although it does not fully match a model, and is identified based on a transaction-and-model dissimilarity, i.e., a dissimilarity between the transaction and the model.

The dissimilarity between the transaction and the model is an edit distance between symbol strings when each component of the transaction and the model is regarded as one symbol. An edit distance between the components p and q is not a constant value "1" but an inter-transaction-component dissimilarity ed(p, q). FIG. 13 is an explanatory diagram for explaining a dissimilarity between a transaction ti and a model Mj. This explanatory diagram illustrates a transaction-and-model dissimilarity between a transaction "t342" and each of models "M2" and "M5".

For example, when "t342" is denoted by a symbol string "WXR" and "M2" is denoted by a symbol string "JKLI" with the use of symbols illustrated in FIG. 12A, a dissimilarity L(t342, M2) between the transaction "t342" and the model "M2" is, as illustrated in FIG. 13, the sum of an edit distance of W→J (0.0789), an edit distance of X→K (0.0714), an edit distance of R→L (0.2758), and a 1-character additional cost (0.020), resulting in 0.4461. Likewise, when "M5" is denoted by a symbol string "WXRYabcdefagbhiI" with the use of the symbols illustrated in FIG. 12A, a dissimilarity L(t342, M5) between the transaction "t342" and the model "M5" is, as illustrated in FIG. 13, a 14-character additional cost, resulting in 14×0.020=0.280. Therefore, if there is no transaction-and-model dissimilarity smaller than 0.280 in transaction-and-model dissimilarities to other models, "M5" shall be a similar model of "t342".

FIG. 14 is a diagram illustrating an example of the analysis-result transaction information stored in the analysis-result-transaction-information storage unit 234. However, in this example, only a transaction that does not match any models is illustrated. As illustrated in this diagram, in a case of a transaction that does not match any models, a model ID is enclosed in parentheses "( )", and a status is "non-matching". An example of analysis-result transaction information on a transaction that matches any model is as illustrated in FIG. 7A. Namely, as described in the explanation of the analysis-result-transaction-information storage unit 134, FIG. 7A illustrates analysis-result transaction information after the detail analysis.

The detail-analysis-result storage unit 235 is a storage unit that stores therein a result of detail analysis of a transaction, and specifically, stores therein information on suspicious points, an evaluation result of a problem of each of the suspicious points, and the like.

The detail-analysis setting processing unit 241 is a processing unit that reads out detail-analysis setting information from the detail-analysis setting-information storage unit 231 and writes the detail-analysis setting information into the reference-information storage unit 260. The inter-transaction-component dissimilarity reading unit 242 is a processing unit that reads out an inter-transaction-component dissimilarity from the inter-transaction-component dissimilarity storage unit 232 and writes the inter-transaction-component dissimilarity into the reference-information storage unit 260.

The model-information reading unit 243 is a processing unit that reads out model information from the model-information storage unit 233 and writes the model information into the reference-information storage unit 260. The transaction-information reading unit 244 is a processing unit that reads out information on a transaction that does not match any models and a transaction which processing time deviates from the normal range from the analysis-result-transaction-information storage unit 234 and writes the information into the reference-information storage unit 260.

The similar-model retrieving unit 245 is a processing unit that retrieves a model similar to a transaction that does not match any models from the reference-information storage unit 260, and writes information on the retrieved similar model as information on a suspicious model into the detail-analysis-result storage unit 235.

The suspicious-model extracting unit 246 is a processing unit that extracts a model that matches a transaction which processing time deviates from the normal range as a suspicious model, and writes information on the extracted suspicious model into the detail-analysis-result storage unit 235.

Figure 15:
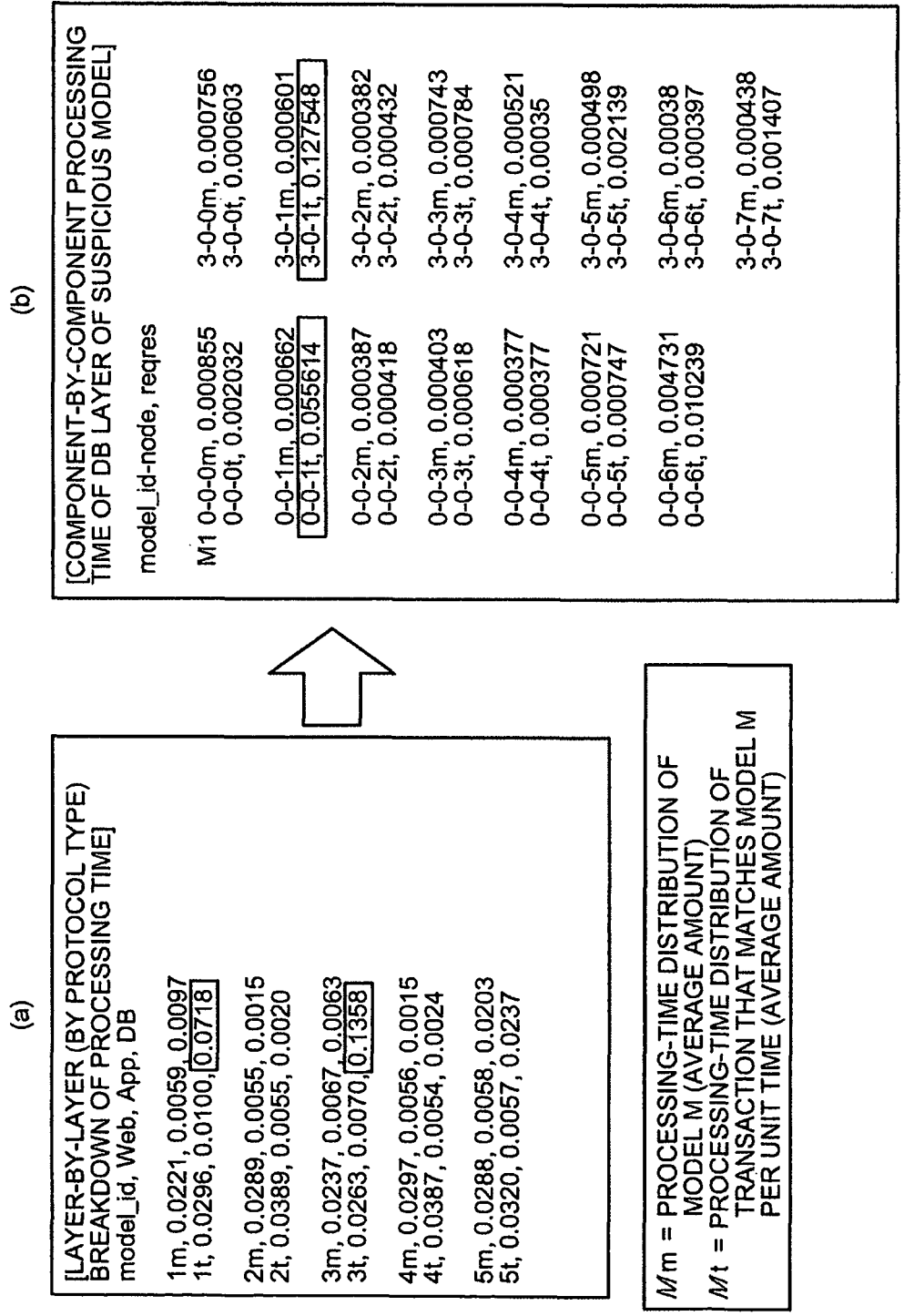
FIG. 15 is an explanatory diagram for explaining a process of extracting a point where a processing time deviates from a normal range as a problematical point.

The suspicious-point-in-suspicious-model extracting unit 247 is a processing unit that extracts a different point between a transaction and a similar model or a point where a processing time deviates from the normal range as a suspicious point. FIG. 15 is an explanatory diagram for explaining a process of extracting a point where a processing time deviates from the normal range as a suspicious point. FIG. 15(a) illustrates a layer-by-layer breakdown of a processing time of each model and a corresponding transaction that matches the model. A case where an average amount of a transaction of DB processing of each of "M1" and "M3" deviates from a normal range calculated by "an average processing time of the model±a coefficient×a standard deviation" is illustrated here.

As illustrated in FIG. 15(b), the suspicious-point-in-suspicious-model extracting unit 247 breaks down a DB processing time of each of the models "M1" and "M3" into component-by-component processing times, and thereby extracting the second component process of the model "M1" and the second component process of the model "M3" as a suspicious point.

The problematical-point evaluating unit 248 is a processing unit that evaluates a problem of each suspicious point as a problematical point based on how many times a suspicious model having the suspicious point emerges in a predetermined time period and how many times a model having the suspicious point or the suspicious model emerges in the predetermined time period, and writes a result of the evaluation into the detail-analysis-result storage unit 235. The number of times the model emerges in the predetermined time period here is the number of transactions that match models in the predetermined time period.

FIG. 16 is an explanatory diagram for explaining the evaluation of a problem by the problematical-point evaluating unit 248. As illustrated in this diagram, the problematical-point evaluating unit 248 evaluates a problem of a problematical point x in a time period s by (the number of times a suspicious model which problematical point x is a suspicious point emerges in the time period s)/(the number of times a model having the problematical point x as a component or the suspicious model emerges in the time period s).

For example, if a problematical point is the table "KOKYAKU", since "KOKYAKU" is the suspicious point of each of the suspicious models "M1" and "M3", a model to be an object of the numerator of the formula for evaluating the problem is "M1" and "M3", and a value of the numerator is the sum of the number of times of emergence of "M1" and the number of times of emergence of "M3", resulting in 11+9=20. Furthermore, as illustrated in FIGS. 6A to 6C, a model including "KOKYAKU" as a component is "M1" and "M3", and the suspicious model is "M1" and "M3", so that a model to be an object of the denominator of the formula for evaluating the problem is "M1" and "M3", and a value of the denominator is also the sum of the number of times of emergence of "M1" and the number of times of emergence of "M3", resulting in 11+9=20. Therefore, a value of the formula for evaluating the problem is 20/20=1.00.

If a problematical point is the table "TANTOSYA", since "TANTOSYA" is the suspicious point of the suspicious model "M3", a model to be an object of the numerator of the formula for evaluating the problem is "M3", and a value of the numerator is the number of times of emergence of "M3", i.e., 9. Furthermore, as illustrated in FIGS. 6A to 6C, a model including "TANTOSYA" as a component is "M1" and "M3", and the suspicious model is "M1" and "M3", so that a model to be an object of the denominator of the formula for evaluating the problem is "M1" and "M3", and a value of the denominator is the sum of the number of times of emergence of "M1" and the number of times of emergence of "M3", resulting in 11+9=20. Therefore, a value of the formula for evaluating the problem is 9/20=0.45.

In this manner, the problematical-point evaluating unit 248 quantitatively evaluates a problem of the problematical point x in the time period s, and therefore it is possible to identify an abnormal cause on the basis of the quantitative evaluation.

The transaction-information update processing unit 249 is a processing unit that updates the analysis-result transaction information stored in the analysis-result-transaction-information storage unit 234 based on a result of detail analysis.

The detail-analysis-result display unit 250 is a processing unit that displays a result of detail analysis stored in the detail-analysis-result storage unit 235 via the output unit 220. FIG. 17 is a diagram illustrating an example of a result of detail analysis to be displayed by the detail-analysis-result display unit 250. As illustrated in this diagram, the detail-analysis-result display unit 250 displays, as a result of detail analysis, problematical points in descending order of problem together with respective suspicious points. The system provider can efficiently identify an abnormal cause of the system based on the result of detail analysis.

The reference-information storage unit 260 is a storage unit that stores therein the detail-analysis setting information, the inter-transaction-component dissimilarity, the model information, and the transaction information that are read by the detail-analysis setting processing unit 241, the inter-transaction-component dissimilarity reading unit 242, the model-information reading unit 243, and the transaction-information reading unit 244, respectively. The information stored in this reference-information storage unit 260 is referred by the similar-model retrieving unit 245, the suspicious-model extracting unit 246, and the suspicious-point-in-suspicious-model extracting unit 247.

The control unit 270 controls the input unit 210, the output unit 220, the detail-analysis setting processing unit 241, the inter-transaction-component dissimilarity reading unit 242, the model-information reading unit 243, the transaction-information reading unit 244, the similar-model retrieving unit 245, the suspicious-model extracting unit 246, the suspicious-point-in-suspicious-model extracting unit 247, the problematical-point evaluating unit 248, the transaction-information update processing unit 249, and the detail-analysis-result display unit 250 those as described above, and makes the transaction detail analyzing device 200 operate as one device. In FIG. 10, the storage units are provided in a magnetic disk device, and arrows between the storage units and the processing units each indicate an access from the processing unit to the storage unit.

Figure 18:
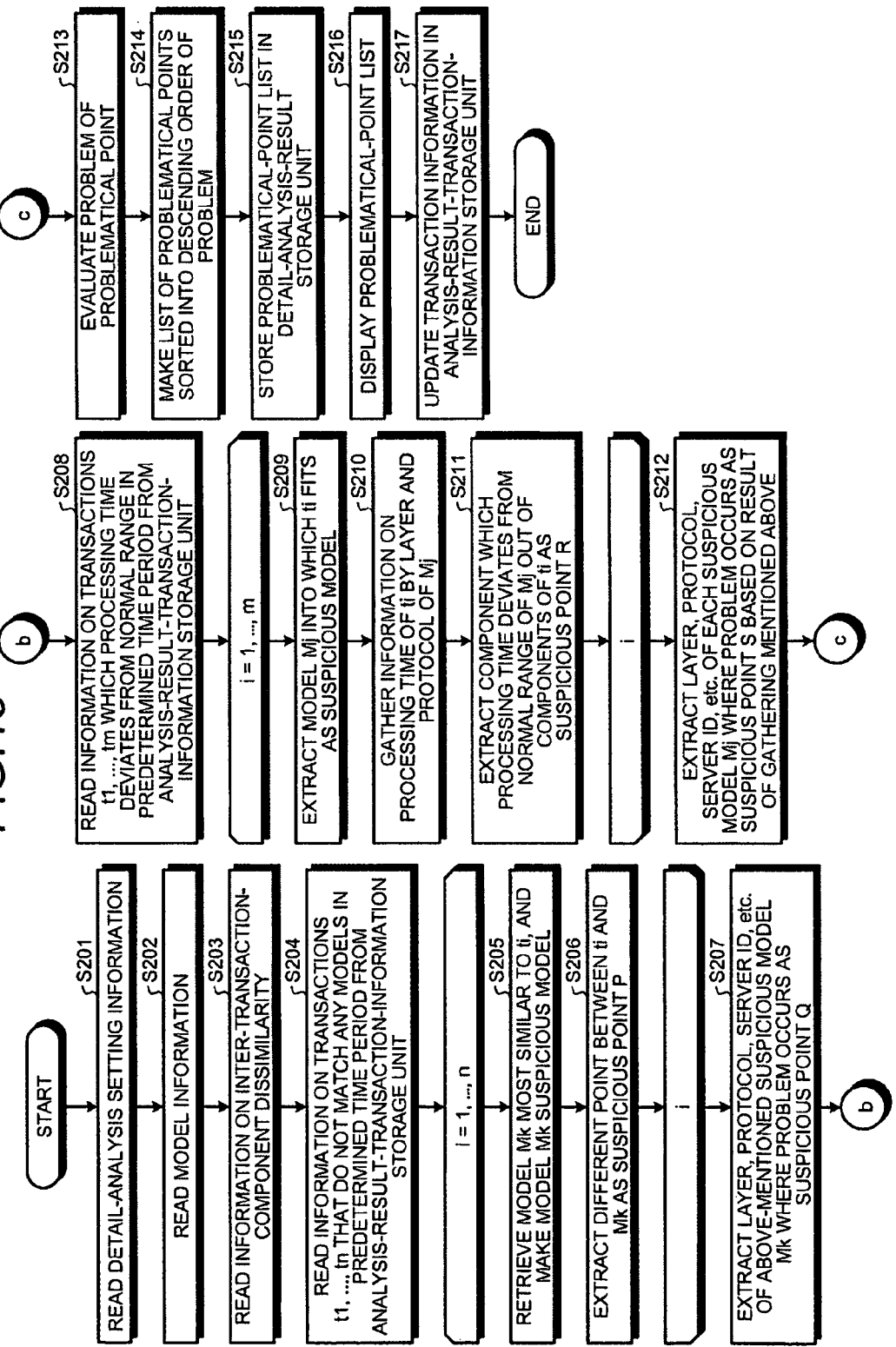
FIG. 18 is a flowchart illustrating procedures of a transaction detail analyzing process performed by a transaction detail analyzing device according to the embodiment.

Subsequently, procedures of a transaction detail analyzing process performed by the transaction detail analyzing device 200 according to the present embodiment is explained. FIG. 18 is a flowchart illustrating the procedures of the transaction detail analyzing process performed by the transaction detail analyzing device 200 according to the present embodiment.

As illustrated in this flowchart, in this transaction detail analyzing process, the detail-analysis setting processing unit 241 reads detail-analysis setting information and writes the detail-analysis setting information into the reference-information storage unit 260 (Step S201), and the model-information reading unit 243 reads model information and writes the model information into the reference-information storage unit 260 (Step S202). Furthermore, the inter-transaction-component dissimilarity reading unit 242 reads an inter-transaction-component dissimilarity and writes the inter-transaction-component dissimilarity into the reference-information storage unit 260 (Step S203).

Then, the transaction-information reading unit 244 reads information on transactions t1, . . . , to that do not match any models in a predetermined time period from the analysis-result-transaction-information storage unit 234, and writes the information into the reference-information storage unit 260 (Step S204). Then, the control unit 270 controls to perform processes at Steps S205 and S206 on information ti on each of the transactions.

Namely, the similar-model retrieving unit 245 reads out ti from the reference-information storage unit 260, retrieves a model Mk most similar to ti, and writes the model Mk as a suspicious model into the detail-analysis-result storage unit 235 (Step S205). Then, the suspicious-point-in-suspicious-model extracting unit 247 extracts a different point between ti and Mk as a suspicious point P, and writes the suspicious point P into the detail-analysis-result storage unit 235 (Step S206). Then, the suspicious-point-in-suspicious-model extracting unit 247 extracts, as a suspicious point Q, a layer, a protocol, a server ID, and the like of the suspicious model Mk where a problem occurs, and writes the suspicious point Q into the detail-analysis-result storage unit 235 (Step S207).

Then, the transaction-information reading unit 244 reads information on transactions tl, . . . , tm which processing time deviates from the normal range in a predetermined time period from the analysis-result-transaction-information storage unit 234, and writes the information into the reference-information storage unit 260 (Step S208). Then, the control unit 270 controls to perform processes at Steps S209 to S211 on information ti on each of the transactions.

Namely, the suspicious-model extracting unit 246 writes a model into which ti fits, i.e., a model Mj that matches ti as a suspicious model into the detail-analysis-result storage unit 235 (Step S209). Then, the suspicious-point-in-suspicious-model extracting unit 247 gathers information on the processing time of ti by layer and protocol of Mj (Step S210), extracts, as a suspicious point R, a component which processing time deviates from the normal range of Mj out of components of ti, and writes the suspicious point R into the detail-analysis-result storage unit 235 (Step S211). Then, the suspicious-point-in-suspicious-model extracting unit 247 extracts, as a suspicious point S, a layer, a protocol, a server ID, and the like of the suspicious model Mj where a problem occurs, and writes the suspicious point S into the detail-analysis-result storage unit 235 (Step S212).

Then, the problematical-point evaluating unit 248 evaluates a problem of each of the suspicious points P, Q, R, and S as a problematical point (Step S213), makes a problematical-point list by sorting the problematical points into descending order of evaluated value of the problem (Step S214), and stores the problematical-point list in the detail-analysis-result storage unit 235 (Step S215). Then, the detail-analysis-result display unit 250 displays the suspicious points and the problematical-point list (Step S216), and the transaction-information update processing unit 249 updates the analysis-result-transaction-information storage unit 234 (Step S217).

As described above, in the present embodiment, the model-match-rate evaluating unit 146 of the transaction monitoring device 100 evaluates a ratio of the number of transactions that match any models and respective processing times of all the layers in the transaction are each within the corresponding normal range to the number of transactions observed per unit time as a model match rate, and therefore it is possible to detect a case where a process takes time although it matches a model as an abnormality. Consequently, it is possible to detect an abnormality more accurately than a case where only whether to match any models is determined as model matching without a processing time.

Furthermore, in the present embodiment, the suspicious-point-in-suspicious-model extracting unit 247 of the transaction detail analyzing device 200 extracts a point where a processing time deviates from the normal range as a suspicious point, the problematical-point evaluating unit 248 evaluates a problem of each suspicious point as a problematical point, and the detail-analysis-result display unit 250 displays an evaluation result of the problematical point and the suspicious point, and therefore it is possible to assist the identification of an abnormal cause of the system. Consequently, a system provider can identify an abnormal cause of the system efficiently.

Moreover, in the present embodiment, when a point where a processing time deviates from the normal range is in the DB layer, the suspicious-point-in-suspicious-model extracting unit 247 extracts a suspicious point at the level of a table constituting the database, and therefore it is possible to assist the analysis at the table level that is critical to the analysis of an abnormal cause of the database system.

The transaction monitoring device and the transaction detail analyzing device are described in the present embodiment. Alternatively, by realizing the configurations of the transaction monitoring device and the transaction detail analyzing device as software, a transaction monitoring program and a transaction detail analyzing program those having the same functions as the transaction monitoring device and the transaction detail analyzing device, respectively, can be obtained. So, a computer that executes these programs is described.

Figure 19:
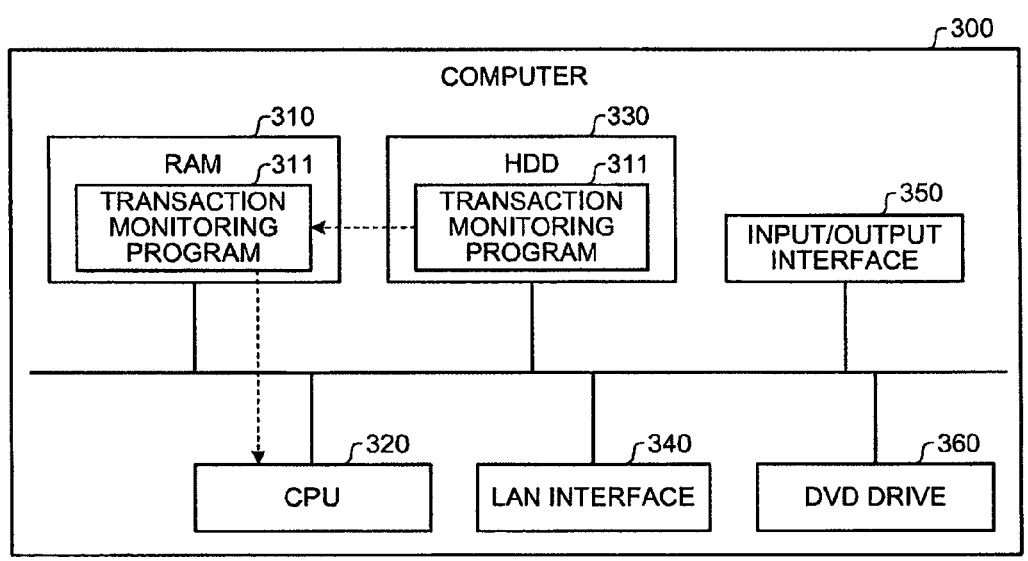
FIG. 19 is a functional block diagram illustrating a configuration of a computer that executes a transaction monitoring program according to the embodiment.

FIG. 19 is a functional block diagram illustrating a configuration of a computer that executes the transaction monitoring program according to the present embodiment. The transaction detail analyzing program can be executed by a computer having the same configuration as this computer. As illustrated in FIG. 19, this computer 300 includes a RAM 310, a CPU 320, an HDD 330, a LAN interface 340, an input/output interface 350, and a DVD drive 360.

The RAM 310 is a memory that stores therein a program, an intermediate result of the program while being in execution, and the like. The CPU 320 is a central processing unit that reads out a program from the RAM 310 and executes the program. The HDD 330 is a disk device that stores therein a program and data. The LAN interface 340 is an interface for connecting the computer 300 to another computer via a LAN. The input/output interface 350 is an interface for connecting an input device, such as a mouse or a keyboard, and a display device. The DVD drive 360 is a device that performs read/write on a DVD.

A transaction monitoring program 311 executed by this computer 300 is stored in a DVD, and read out from the DVD and installed on the computer 300 by the DVD drive 360. Alternatively, this transaction monitoring program 311 is stored in a database of another computer system connected to the computer 300 via the LAN interface 340 or the like, and read out from the database and installed on the computer 300. Then, the installed transaction monitoring program 311 is stored in the HDD 330, read into the RAM 310, and executed by the CPU 320.

In the present embodiment, a case where transactions are monitored and analyzed is described; however, the present invention is not limited to this, and can be applied to a computer system that performs a unit process such as a transaction in the same manner.

According to an embodiment, a unit process that is abnormal in processing time in spite of matching a unit-process model is detected, and therefore it is possible to detect an abnormality of a system more accurately than a case where a processing time is not used for the detection of an abnormality of the system.

Furthermore, according to an embodiment, the identification of an abnormal cause is facilitated, and therefore a system provider can respond to the abnormality of the system efficiently.

Moreover, according to an embodiment, the identification of the abnormal cause is assisted at the more detailed level, and therefore the system provider can respond to the abnormality of the system efficiently.

Furthermore, according to an embodiment, the analysis of the abnormality is assisted on the basis of quantitative data, and therefore it is possible to analyze the abnormality of the system accurately.

Moreover, according to an embodiment, an abnormality of a business system is detected accurately, and therefore it is possible to assist the operation of the business system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable storage medium having stored therein a system monitoring program monitoring a system that executes multiple types of unit processes, the system monitoring program causing a computer to execute a procedure, the procedure comprising: calculating, as a model match rate, a ratio of the number of unit processes that match any unit-process models, that is are models of the multiple types of the unit processes, and also processing time times of which are normal to the number of unit processes observed per unit time; and determining whether the system is normal or not based on the calculated model match rate.

2. The non-transitory computer readable storage medium according to claim 1, the procedure comprising: identifying an abnormal component process out of multiple component processes composing the unit process based on a processing time of each of the component processes when the system is not determined to be normal at the determining, with respect to a unit process determined that a processing time of which is not normal at the calculating.

3. The non-transitory computer readable storage medium according to claim 2, the procedure comprising: identifying a suspicious point to be marked as a cause of an abnormality of the component process identified at the identifying-abnormal-component-process based on a processing time of each component point.

4. The non-transitory computer readable storage medium according to claim 3, the procedure comprising: evaluating, when multiple suspicious points are identified at the identifying-suspicious-point, a problem of each of the suspicious points based on how many times a transaction that matches a suspicious model, that is a model having any of the suspicious points, emerges in a predetermined time period and how many times a transaction that matches a model having any of the suspicious points as a component or the suspicious model emerges in the predetermined time period; and outputting the problem.

5. The non-transitory computer readable storage medium according to claim 4, wherein
 the unit process is transaction processing of a business system, the multiple component processes are Web processing, application processing, and database processing, and
 a suspicious point of the database processing includes a table constituting a database.

6. A system monitoring method for monitoring a system that executes multiple types of unit processes, the method comprising:
 calculating, as a model match rate, a ratio of the number of unit processes that match any unit-process models, that are models of the multiple types of the unit processes, and also processing times of which are normal to the number of unit processes observed per unit time; and
 determining whether the system is normal or not based on the calculated model match rate.

7. A system monitoring device for monitoring a system that executes multiple types of unit processes, the system monitoring device comprising:
 a model-match-rate calculating unit that calculates, as a model match rate, a ratio of the number of unit processes that match any unit-process models, that are models of the multiple types of the unit processes, and also processing times of which are normal to the number of unit processes observed per unit time; and
 a system-status determining unit that determines whether the system is normal or not based on the model match rate calculated by the model-match-rate calculating unit.

* * * * *

UNITED STATES PATENT AND TRADEMARK OFFICE
CERTIFICATE OF CORRECTION

PATENT NO. : 8,448,028 B2
APPLICATION NO. : 12/656147
DATED : May 21, 2013
INVENTOR(S) : Yukiko Seki et al.

It is certified that error appears in the above-identified patent and that said Letters Patent is hereby corrected as shown below:

In the Claims

Column 17, Line 20, In Claim 1, delete "is are" and insert -- are --, therefor.

Column 17, Line 21-22 (Approx.), In Claim 1, delete "time times" and insert -- times --, therefor.

Signed and Sealed this
Twenty-seventh Day of August, 2013

Teresa Stanek Rea
*Acting Director of the United States Patent and Trademark Office*